United States Patent
Fan et al.

(10) Patent No.: US 10,705,061 B2
(45) Date of Patent: Jul. 7, 2020

(54) MICROFLUIDIC PHOTOIONIZATION DETECTOR

(71) Applicant: THE REGENTS OF THE UNIVERSITY OF MICHIGAN, Ann Arbor, MI (US)

(72) Inventors: Xudong Fan, Saline, MI (US); Hongbo Zhu, Ann Arbor, MI (US); Robert Nidetz, Saline, MI (US); Katsuo Kurabayashi, Ann Arbor, MI (US); Menglian Zhou, Ann Arbor, MI (US); Jiwon Lee, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 238 days.

(21) Appl. No.: 15/571,792

(22) PCT Filed: May 4, 2016

(86) PCT No.: PCT/US2016/030798
§ 371 (c)(1),
(2) Date: Nov. 3, 2017

(87) PCT Pub. No.: WO2016/179291
PCT Pub. Date: Nov. 10, 2016

(65) Prior Publication Data
US 2018/0164261 A1 Jun. 14, 2018

Related U.S. Application Data

(60) Provisional application No. 62/157,238, filed on May 5, 2015.

(51) Int. Cl.
*G01N 30/64* (2006.01)
*G01N 30/74* (2006.01)
(Continued)

(52) U.S. Cl.
CPC ............ *G01N 30/64* (2013.01); *G01N 27/66* (2013.01); *G01N 27/68* (2013.01);
(Continued)

(58) Field of Classification Search
CPC ........ G01N 30/00; G01N 30/02; G01N 30/60; G01N 30/6095; G01N 30/62; G01N 30/64;
(Continued)

(56) References Cited

U.S. PATENT DOCUMENTS 5,855,850 A   1/1999  Sittler
6,225,633 B1  5/2001  Sun et al.
(Continued)

FOREIGN PATENT DOCUMENTS

CN    101603945 A    12/2009
CN    101536301 B    3/2013
(Continued)

OTHER PUBLICATIONS

International Search Report and Written Opinion of the International Searching Authority issued in PCT/US2016/030798, dated Sep. 7, 2016; ISA/KR.
(Continued)

*Primary Examiner* — Hoai-An D. Nguyen
(74) *Attorney, Agent, or Firm* — Harness, Dickey & Pierce, P.L.C.

(57) ABSTRACT

A rapid flow-through, highly sensitive microfluidic photoionization detector (PID) which is micro-fabricated directly onto a substrate, such as a conductive silicon wafer, is provided. The microfluidic PID has an ionization chamber volume of less than 9 µL. The microfluidic PID may have a flow through design with a microfluidic channel defines a serpentine pattern on the substrate. The flow through design of the microfluidic PID results in negligible dead volume,
(Continued)

thus allowing a shortened response time over existing commercially available designs. Such microfluidic PIDs are particularly useful with gas chromatography (GC), including microGC and multi-dimensional microGC systems. Methods for calibrating PIDs are also provided.

18 Claims, 23 Drawing Sheets

(51) Int. Cl.
G01N 27/66 (2006.01)
G01N 27/68 (2006.01)
G01N 30/60 (2006.01)
(52) U.S. Cl.
CPC ......... *G01N 30/6095* (2013.01); *G01N 30/74* (2013.01); *G01N 2030/642* (2013.01)
(58) Field of Classification Search
CPC ............. G01N 30/71; G01N 2030/642; G01N 2030/746; G01N 27/00; G01N 27/62; G01N 27/64; G01N 27/66; G01N 27/68
USPC ............... 324/459, 464; 422/50, 68.1, 82.01, 422/82.03, 82.04, 83, 98
See application file for complete search history.

(56) References Cited

U.S. PATENT DOCUMENTS

| | | | |
|---|---|---|---|
| 6,313,638 | B1 | 11/2001 | Sun et al. |
| 6,534,765 | B1 | 3/2003 | Robb et al. |
| 8,222,843 | B2 | 7/2012 | Crocomo et al. |
| 2008/0131327 | A1* | 6/2008 | Van Dam .......... B01L 3/502715 422/400 |
| 2009/0150087 | A1 | 6/2009 | Steinecker |
| 2010/0233038 | A1* | 9/2010 | Park .................. B01L 3/502715 422/504 |
| 2011/0066108 | A1* | 3/2011 | Geipel .................. A61M 5/141 604/151 |
| 2012/0136268 | A1 | 5/2012 | Li et al. |
| 2013/0199264 | A1 | 8/2013 | Seike |
| 2014/0243562 | A1 | 8/2014 | Omeis et al. |
| 2015/0376692 | A1* | 12/2015 | Esfandyarpour .... C12Q 1/6874 506/2 |
| 2018/0045562 | A1* | 2/2018 | Santori .............. G02B 6/12007 |

FOREIGN PATENT DOCUMENTS

| | | |
|---|---|---|
| DE | 4320607 A1 | 12/1994 |
| EP | 1243921 A2 | 9/2002 |
| EP | 2148194 A1 | 1/2010 |
| JP | S63158454 A | 7/1988 |
| JP | H08160027 A | 6/1996 |
| JP | 2000266270 A | 9/2000 |
| JP | 2003515105 A | 4/2003 |
| JP | 2011122855 A | 6/2011 |
| JP | 2012118063 A | 6/2012 |
| JP | 2014529746 A | 11/2014 |
| WO | 2008042482 A2 | 4/2008 |

OTHER PUBLICATIONS

Supplementary Partial European Search Report for European Patent Application No. 16790021.6 dated Dec. 10, 2018, 17 pages.
Supplementary European Search Report for European Patent Application No. 16790021.6 dated Apr. 10, 2019, 20 pages.
Akbar, M. et al., "GC-on-chip: integrated column and photoionization detector," Lab on a Chip (2015), 15, pp. 1748-1758; DOI: 10.1039/c4lc01461h.
Sun, J.H. et al., "Design, Modeling, Microfabrication and Characterization of the Micro Gas Chromatography Columns," Advanced Gas Chromatography—Progress in Agricultural, Biomedical and Industrial Applications, Mar. 21, 2012, InTech, ISB: 78-953-51-0298-4; DOI: 10.5772/32270.
Sun, Jianhai et al., "An improved photoionization deterctor with a micro gas chromatography column for portabel rapid gas chromatography system," Sensors and Actuators B, 188, pp. 513-518 (Publsished online Jul. 29, 2013); DOI: 10.1013/j.snb.2013.07.066.
First Office Action for Chinese Patent Application No. 201680032848.X dated Jul. 2, 2019 with English language translation provided by Unitalen Attorneys at Law, 20 pages.
First Office Action for Japanese Patent Application No. 2017-557966 dated Feb. 13, 2020 with English language translation provided by Asamura Patent Office, 6 pages.

* cited by examiner

MICROFLUIDIC PHOTOIONIZATION DETECTOR

CROSS-REFERENCE TO RELATED APPLICATIONS

This application claims the benefit of U.S. Provisional Application No. 62/157,238, filed on May 5, 2015. The entire disclosure of the above application is incorporated herein by reference.

GOVERNMENT RIGHTS

This application is a U.S. National Phase Application under 35 U.S.C. 371 of International Application No. PCT/US2016/030798 file on May 4, 2016 and published as WO 2016/179291 A1 on Nov. 10, 2016. This application claims the benefit of U.S. Provisional Application No. 62/157,238 filed on May 5, 2015. The entire disclosures of the above application are incorporated herein by reference.

FIELD

The present disclosure relates to a highly sensitive microfluidic photoionization detector that can be used with gas chromatography for target analyte detection and analysis.

BACKGROUND

Gas chromatography (GC) is widely used for analysis of volatile organic compounds (VOCs) and other analyte compounds. GC systems also typically include an analyte detector when used for analysis. Flame ionization detectors (FIDs) are commonly used vapor detectors for bench-top GC instruments. FIDs have a high sensitivity (detection limits on the pico-gram scale), large dynamic range (6 orders of magnitude), and zero dead volume. Miniaturized FIDs (μFIDs) are being developed for portable applications. However, FIDs and μFIDs are destructive and cannot be placed in the middle of vapor flow path to monitor multi-dimensional GC separation. Instead, they are used only in the terminal end of a GC instrument. Furthermore, the required use of hydrogen hinders their broad acceptance in μGC devices.

Thermal conductivity detectors (TCDs) and μTCDs have also been used as a vapor detector. They are non-destructive and have a flow-through design. However, TCDs suffer from low sensitivity (nano-gram) and require helium. Electron capture detectors (ECDs) are another type of non-destructive vapor detector. While they are very sensitive, they have a limited dynamic range and need to use radioactive materials for analyte ionization. Recently, many other types of miniaturized non-destructive vapor detectors have been developed for μGC applications, including surface acoustic wave (SAW), chemi-capacitors, chemi-resistors, optical vapor sensors, and nano-electronic sensors. These sensors are small in footprint and non-destructive. However, they may suffer from large dead volumes, low sensitivity, electrical-optical-electrical conversions (for all optical vapors sensors), or limited vapor types. In addition, those vapor sensors usually require polymer coatings on their surface to capture and interact with analytes, which may limit the types of analytes detected and/or slow down the detection speed due to the absorption and desorption processes.

A photoionization detector (PID) is another type of vapor detector that has been under development for the past 50 years. They are sensitive (pico-gram), non-destructive, and applicable to a wide range of vapors. PIDs are non-destructive and can be used to detect a variety of organic and inorganic compounds. Furthermore, they have a large dynamic range (six orders of magnitude). Nevertheless, PIDs suffer from tardy response times resulting from the large ionization chamber and dead volume, so the use and integration of the PID in GC systems has been limited. It would be desirable to have a rapid PID detector with improved response times and high analyte sensitivity.

SUMMARY

This section provides a general summary of the disclosure, and is not a comprehensive disclosure of its full scope or all of its features.

In various aspects, the present disclosure provides a microfluidic photoionization detector (PID). The PID may comprise a substrate that has a microfluidic channel. The microfluidic channel has an inlet that receives a fluid sample and an outlet from which the fluid sample exits the microfluidic channel. In certain variations, the microfluidic channel has a total volume of less than about 9 μL. The PID device may also include a first electrode region and a distinct second electrode region defined on the substrate. The first electrode region may be separated from the second electrode region by the microfluidic channel. The PID device also has a source of UV light that has a transparent window. The transparent window is adjacent to at least a portion of the microfluidic channel. The source of UV light is configured to direct photons to the portion of the microfluidic channel.

In other aspects, the present disclosure a microfluidic photoionization detector (PID) comprising a substrate that has a microfluidic channel. The microfluidic channel has an inlet that receives a fluid sample and an outlet from which the fluid sample exits the microfluidic channel. In certain variations, the microfluidic channel defines a serpentine pattern on the substrate. The PID device may also include a first electrode region and a distinct second electrode region defined on the substrate. The first electrode region may be separated from the second electrode region by the microfluidic channel. The PID device also has a source of UV light that has a transparent window. The transparent window is disposed adjacent to at least a portion of the microfluidic channel. The source of UV light is configured to direct photons to the portion of the microfluidic channel.

In certain other aspects, a microfluidic photoionization detector (PID) is provided that comprises a substrate comprising a microfluidic channel having an inlet that receives a fluid sample and an outlet from which the fluid sample exits the microfluidic channel. A dead volume of the microfluidic channel is less than or equal to about 1% of a total volume of the microfluidic channel. The PID also includes a first electrode region and a distinct second electrode region defined on the substrate, wherein the first electrode region is separated from the second electrode region by the microfluidic channel and a source of UV light having a transparent window that is adjacent to at least a portion of the microfluidic channel, wherein the source of UV light is configured to direct photons to the portion of the microfluidic channel.

In yet other aspects, the present disclosure provides a detection system for one or more VOC analytes. The system comprises a gas chromatography (GC) unit that comprises at least one gas chromatography column. The system further comprises a microfluidic photoionization detector (PID). The PID device has a substrate comprising a microfluidic channel having an inlet that receives a fluid sample and an outlet from which the fluid sample exits the microfluidic channel. In certain variations, the microfluidic channel has a total volume of less than about 9 µL. In other variations, the microfluidic channel defines a serpentine pattern on the substrate. The PID device may also include a first electrode region and a distinct second electrode region defined on the substrate. The first electrode region may be separated from the second electrode region by the microfluidic channel. The PID device also has a source of UV light that has a transparent window. The transparent window is disposed adjacent to at least a portion of the microfluidic channel. The source of UV light is configured to direct photons to the portion of the microfluidic channel. In this manner, PID device analyzes a sample processed in the gas chromatography (GC) unit.

In further aspects, the present disclosure contemplates a method of calibrating a detection system comprising multiple photoionization detector (PID). The method may include measuring a first quantity of an analyte passing through a reference photoionization detector in the system and determining a first peak area ($A_i$) for the first quantity. Then, a second quantity of the analyte passing through one or more second photoionization detectors downstream of the reference photoionization detector in the system can also be measured and at least one second peak area ($A_{1A}$) for the second quantity can be determined. A calibration factor ($E_i$) can be calculated, for example, by the equation $$E_i = \frac{A_i}{A_{1A}}.$$

The one or more second photoionization detectors can be calibrated based on the calibration factor Ei.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 6:
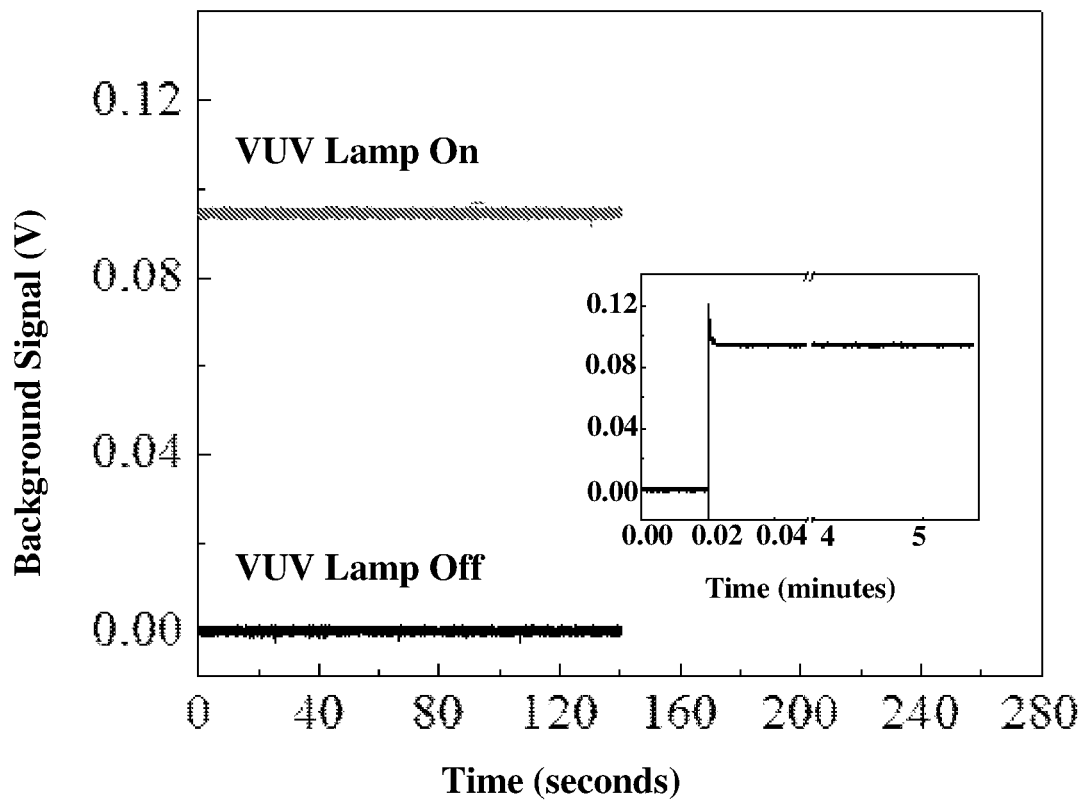

FIG. 6 shows background signal (V) versus time (seconds) for a microfluidic photoionization detector (PID) device system according to certain aspects of the present disclosure, with both the vacuum ultraviolet (VUV) light turned off as a baseline and the VUV light turned on. The standard deviation of the noise is 0.68 mV. Amplification=10×. Internal resistance of the amplifier=100 MΩ+25 pF. During the measurement, helium flows through the microfluidic PID at a flow rate of 2 mL/min. Inset shows long-term stability up to 5.5 minutes.

Figures 7A, 7B:
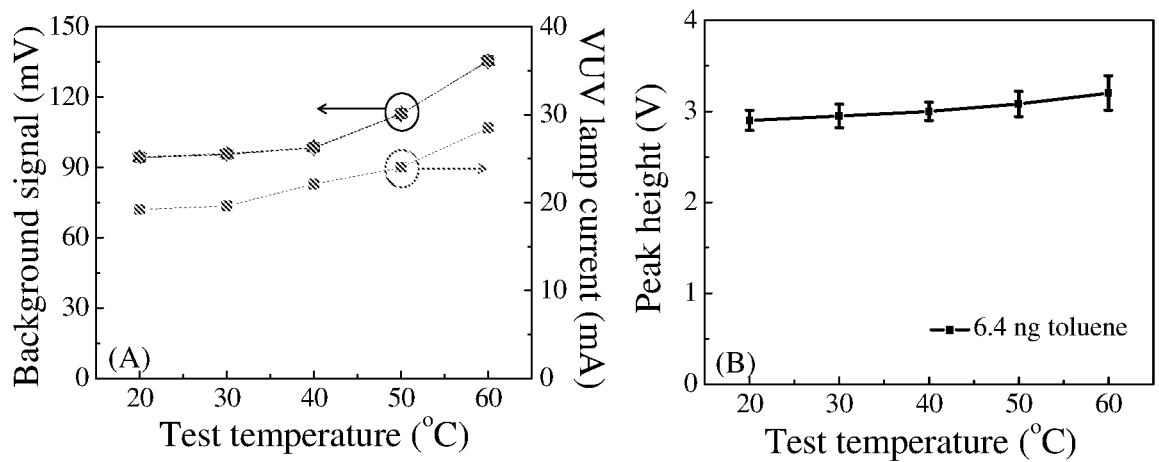

FIGS. 7A-7B show temperature stability tests for microfluidic photoionization detector (PID) device system according to certain aspects of the present disclosure. FIG. 7A shows left Y-axis: Baseline signal as a function of device temperature. The noise level remains the same as for 20° C. Right Y-axis: Current of the VUV lamp drive circuit. FIG. 7B shows PID sensitivity to analyte as a function of temperature. The corresponding baselines are removed. Error bars are calculated based on 4 measurements.

Figures 8A, 8B, 8C:
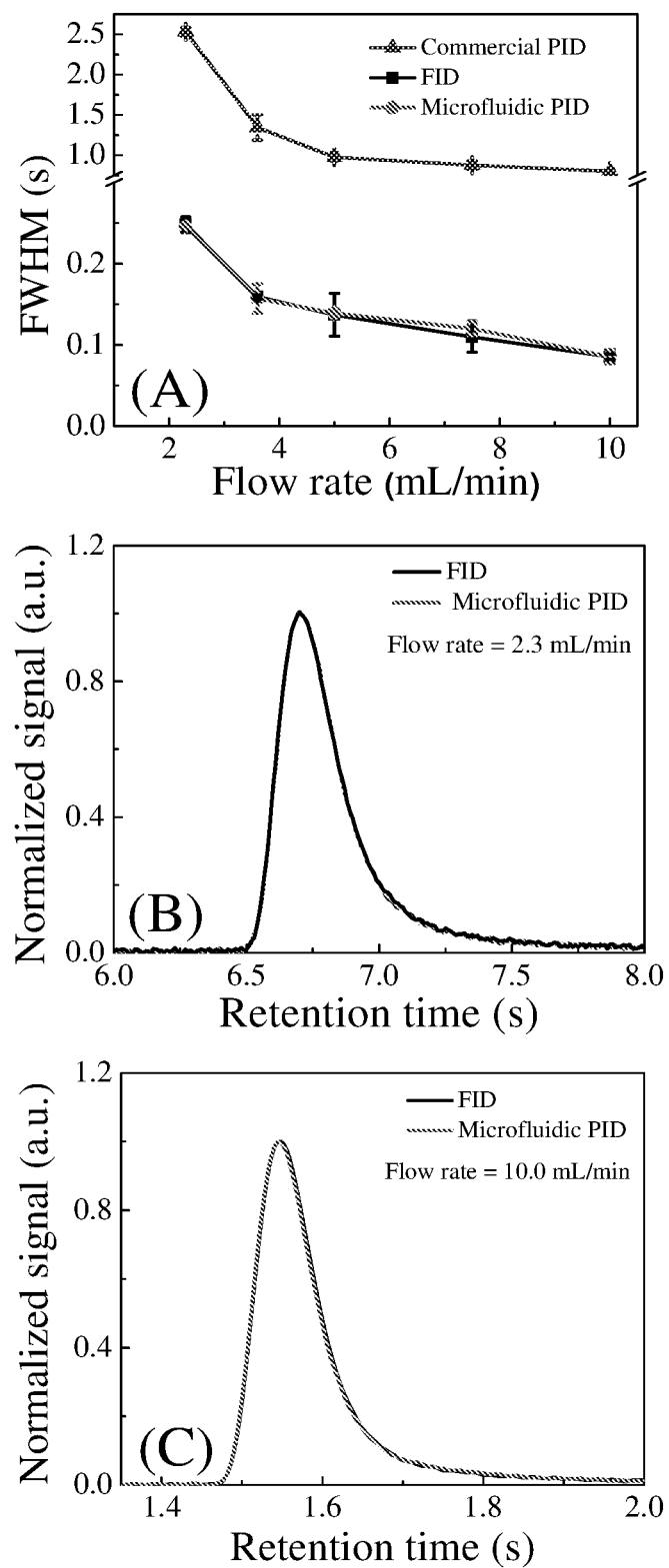

FIGS. 8A-8C show comparative performance charts of a microfluidic photoionization detector (PID) device according to certain aspects of the present disclosure as compared to conventional commercial PID or FID detectors. FIG. 8A shows comparisons of full-width-at-half-maximum (FWHM) of the toluene peak obtained with commercial PID, FID, and microfluidic PID at various flow rates. Error bars are calculated based on four measurements. FIGS. 8B-8C show normalized toluene peaks obtained with FID and microfluidic PID at flow rates of 2.3 mL/min and 10 mL/min, showing FWHM of 0.25 seconds and 0.085 seconds, respectively. The response time measured from the bottom to 90% of peak height is approximately 65% of FWHM.

Figure 9A:
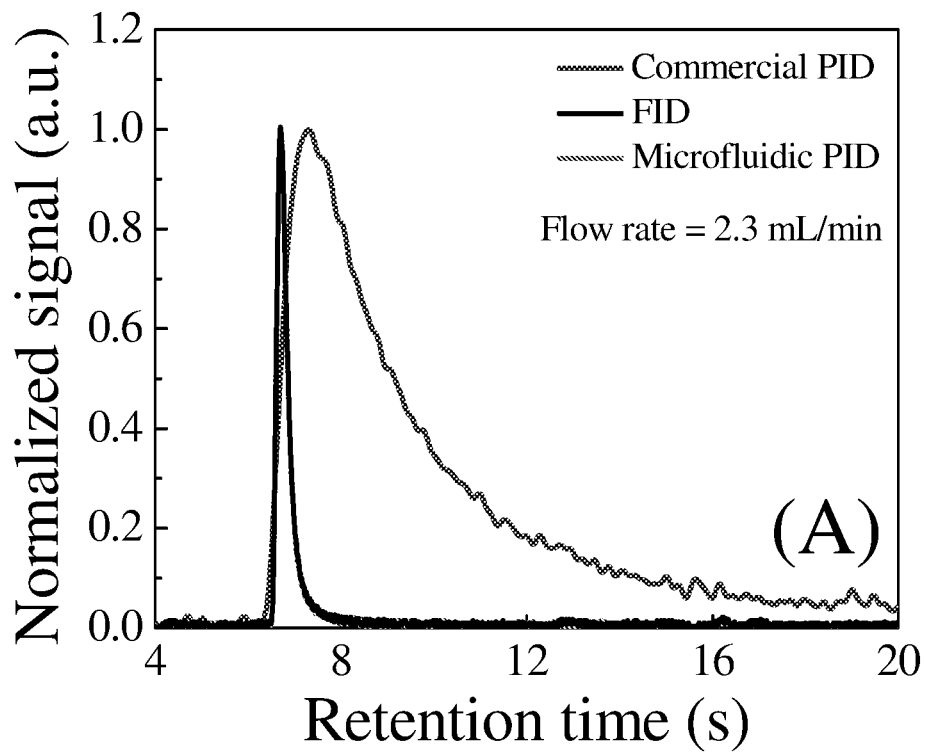
Figure 9B:
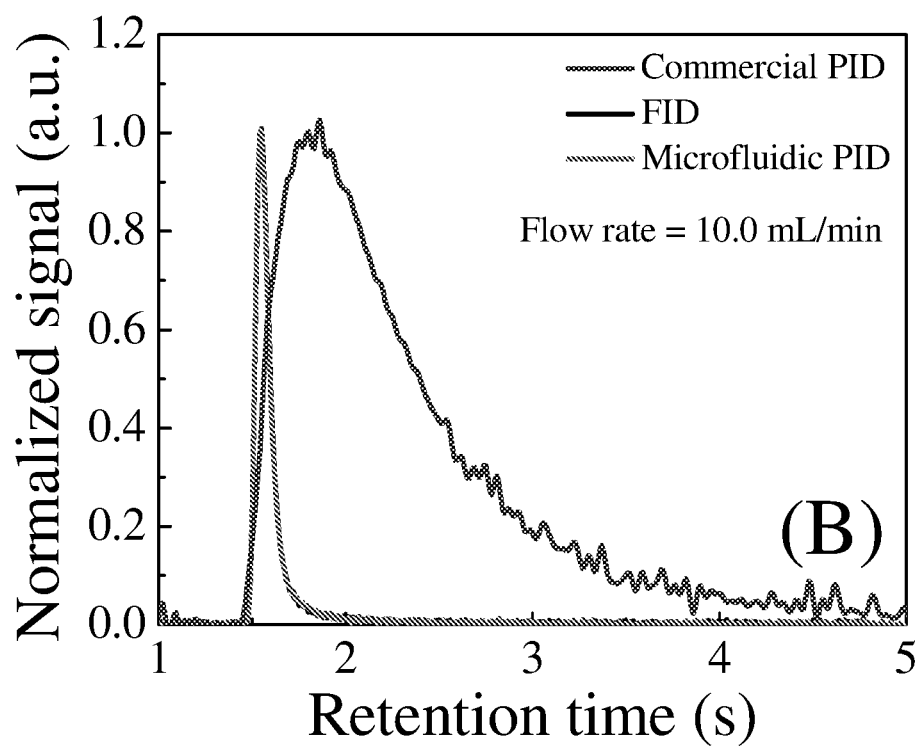

FIGS. 9A-9B show comparative normalized chromatography peaks (signal (a.u.) versus time (seconds)) for toluene in a microfluidic photoionization detector (PID) device according to certain aspects of the present disclosure as compared to conventional commercial PID or FID detectors. FIG. 9A shows data where a flow rate of toluene is 2.3 mL/min and FIG. 9B shows a flow rate of 10 mL/min.

Figure 10:
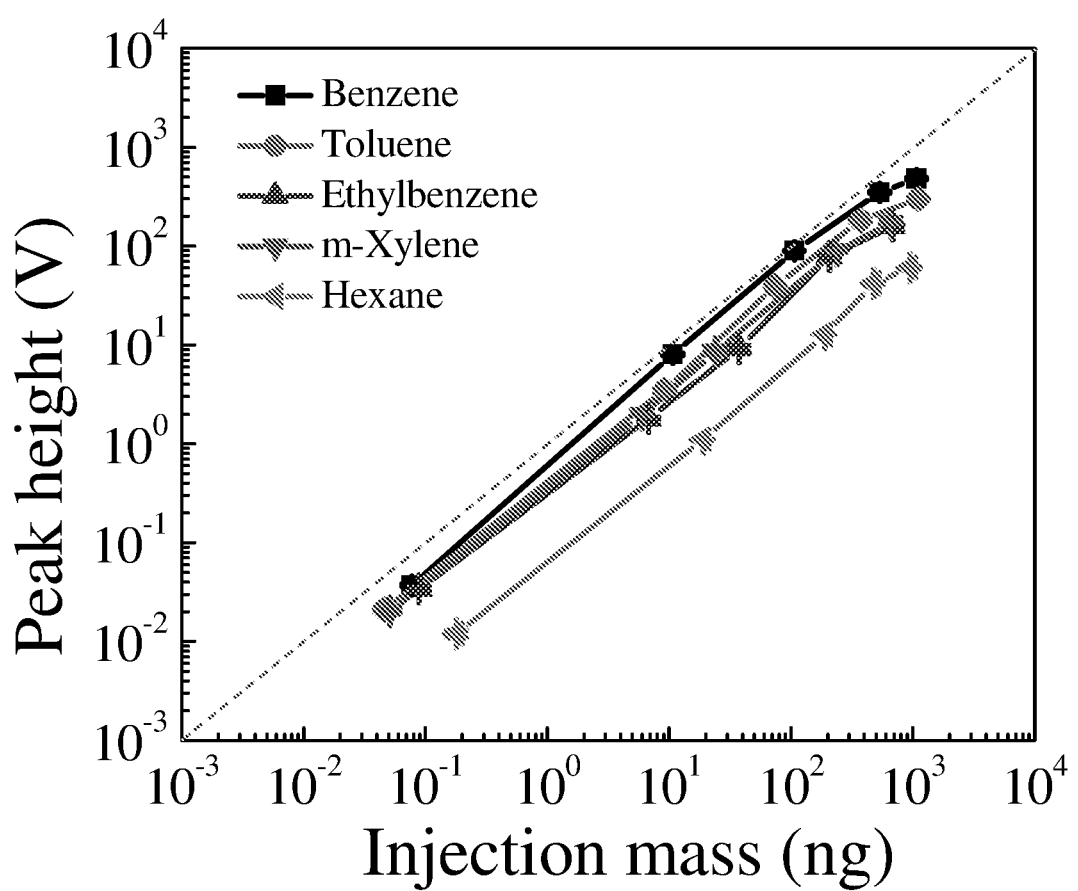

FIG. 10 plots the peak height as a function of injection mass for the five selected VOCs (benzene, toluene, ethylbenzene, m-xylene, and hexane) in a gas chromatography and microfluidic photoionization detector (PID) system according to certain aspects of the present disclosure.

Figures 11A, 11B:
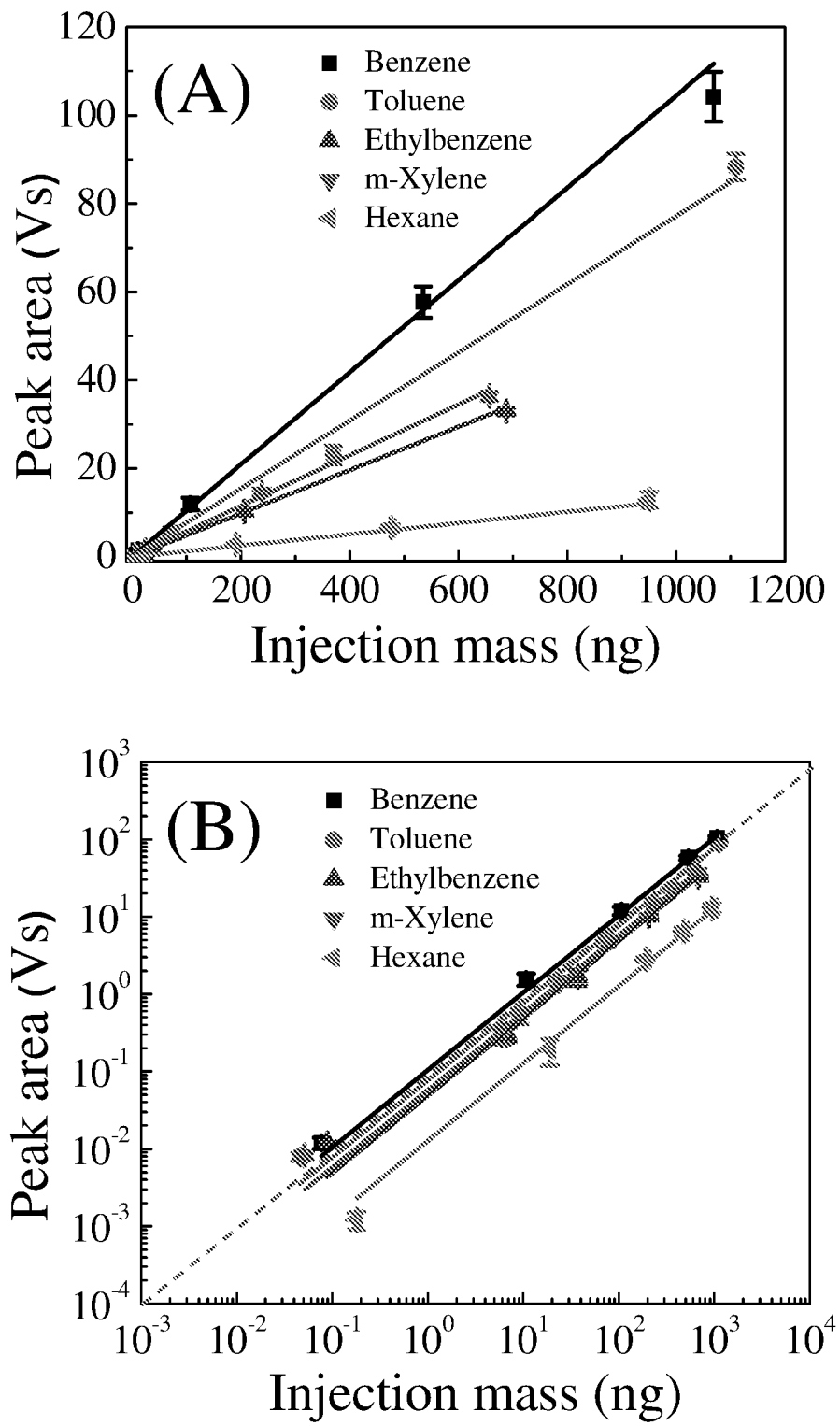

FIGS. 11A-11B show a linearity test for five different VOCs in a microfluidic photoionization detector (PID) device system according to certain aspects of the present disclosure. FIG. 11A shows a peak area (Vs) as a function of injection mass (ng) in the linear-linear scale. Solid lines are the linear fit (forced zero Y-intercept). The corresponding fit parameters are given in Table 5. Error bars are obtained with 4 measurements. FIG. 11B shows corresponding data and curves in FIG. 11A plotted in the log-log scale. The dash line shows the curve with a unity slope to guide an eye.

Figure 12:
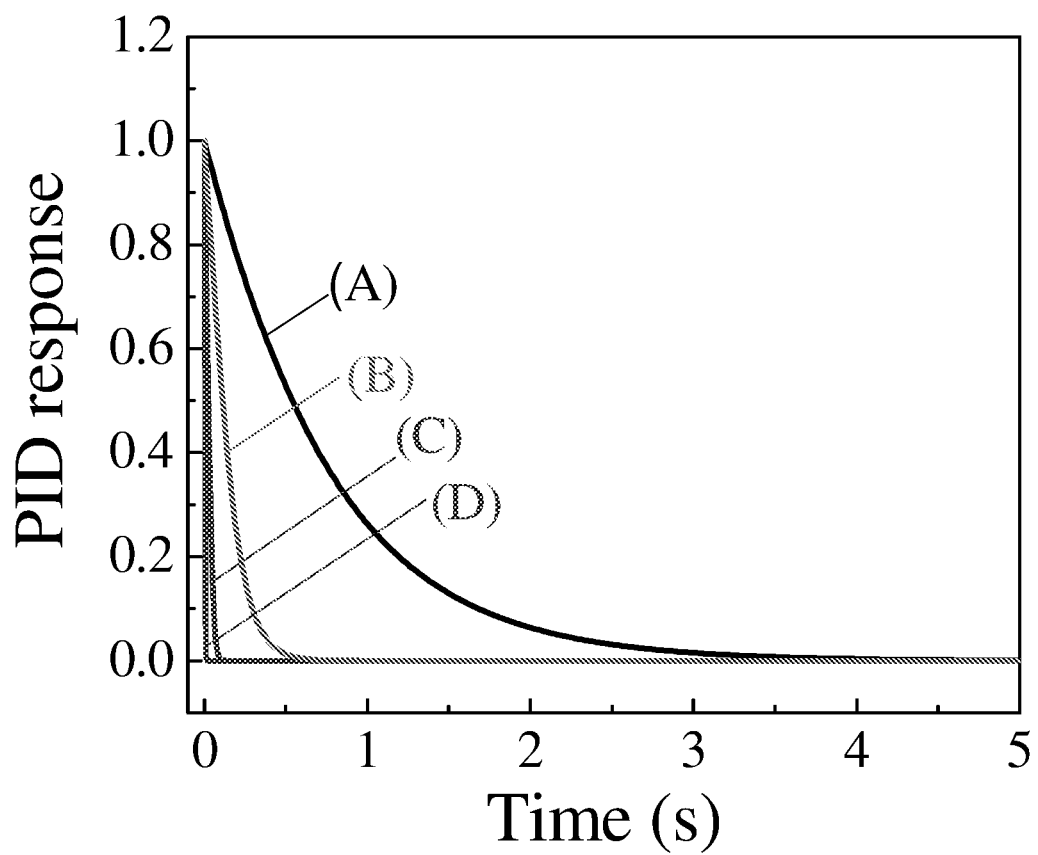

FIG. 12 shows a normalized PID response (proportional to the volume-averaged toluene concentration inside an ionization chamber) as a function of purging time for various chamber sizes. Curves (A)-(D) correspond to FIGS. 13A-13D below. The fall time (i.e., the time from the peak to 10% of the peak) is 1.69 seconds, 0.3 seconds, 0.049 seconds, and 0.0035 seconds, respectively, for Curves (A)-(D).

Figures 13A, 13B:
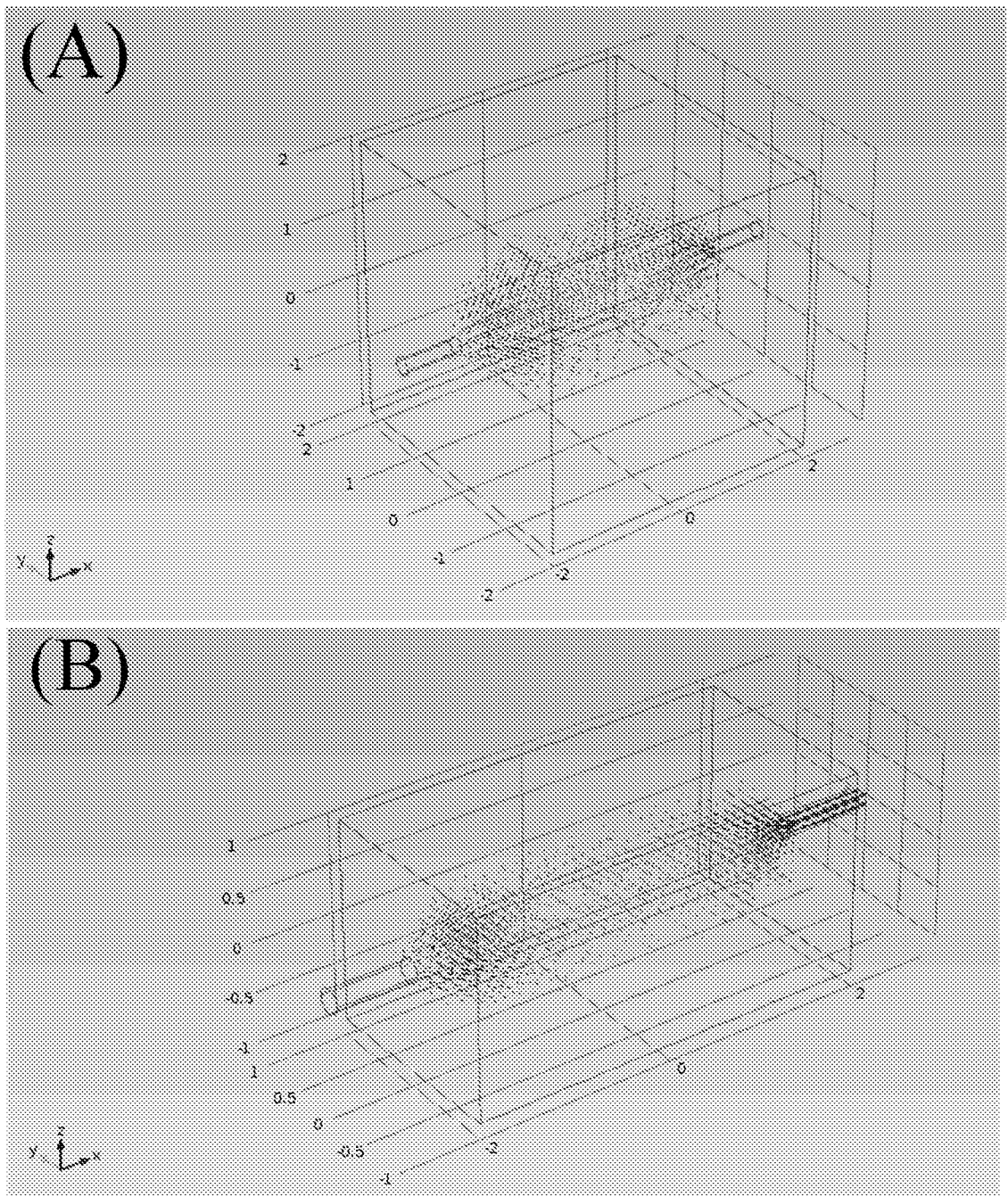
Figures 13C, 13D:
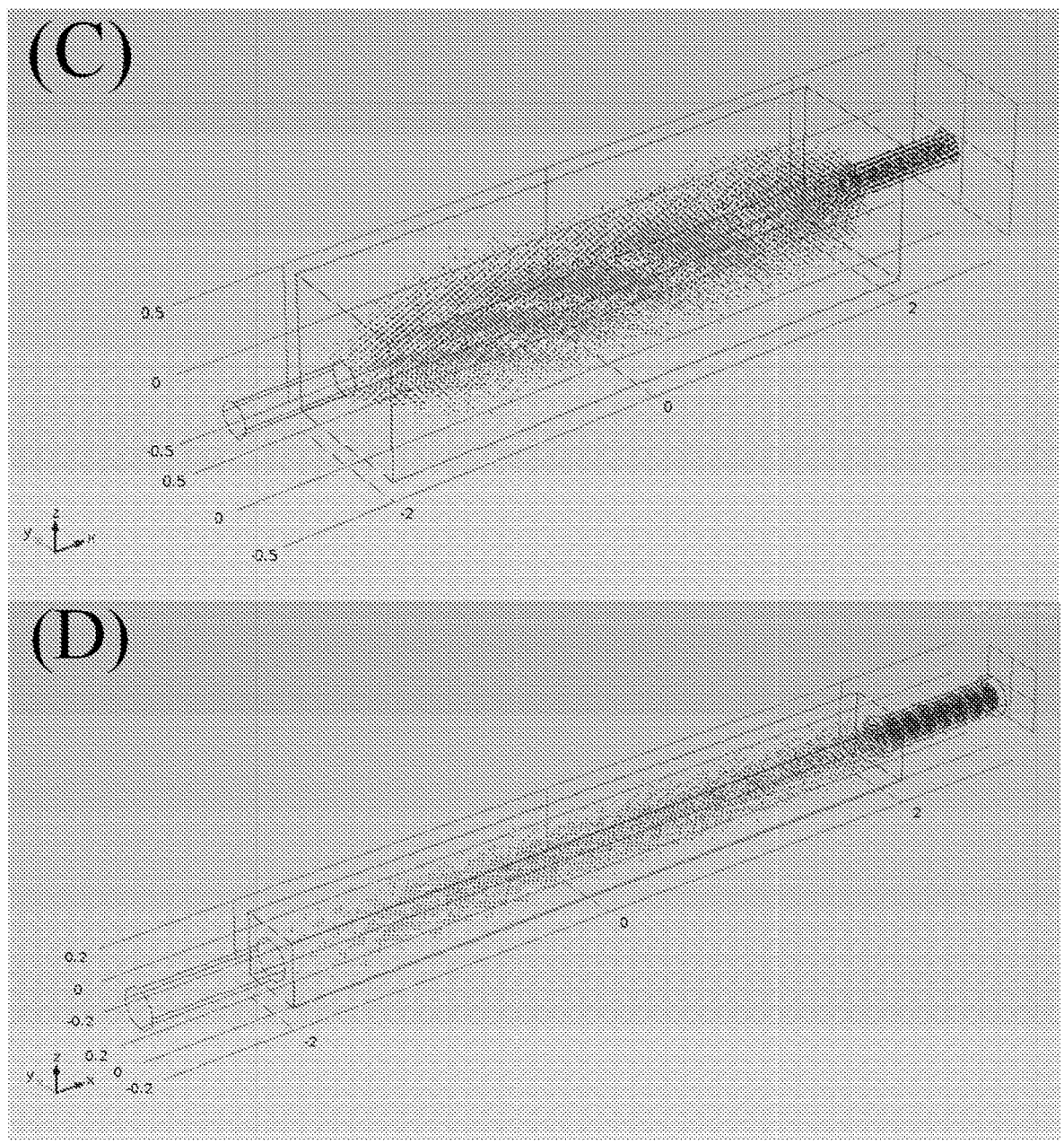

FIGS. 13A-13D show COMSOL simulations of analyte (toluene) concentration (flux) magnitude for various sizes of ionization chambers. FIG. 13A shows a chamber with dimensions of 4×4×4 mm³=64 µL. FIG. 13B shows a chamber with dimensions of 2×2×4 mm³=16 µL. FIG. 13C shows a chamber with dimensions of 1×1×4 mm³=4 µL. FIG. 13D shows a chamber with dimensions of 0.4×0.4×4 mm³=0.64 µL. Each chamber has an inlet and an outlet with a diameter of 0.25 mm. Initially, the chamber is filled homogeneously with toluene. Purging gas, helium, is flowed in at t=0 at a flow rate of 5 mL/min to purge the chamber. The dead volume, defined as the region inside the chamber having a helium flow velocity less than 10% of the maximal velocity, is estimated to be 35.7 µL, 6.55 µL, 1.57 µL, and 0.24 µL, respectively, for (A)-(D).

Figures 14A, 14B:
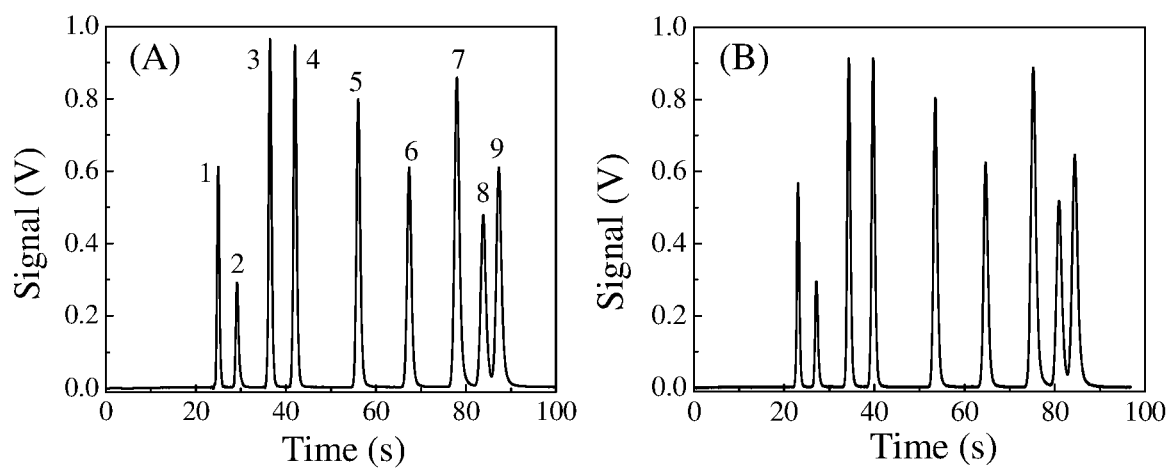
Figures 15A, 15B:
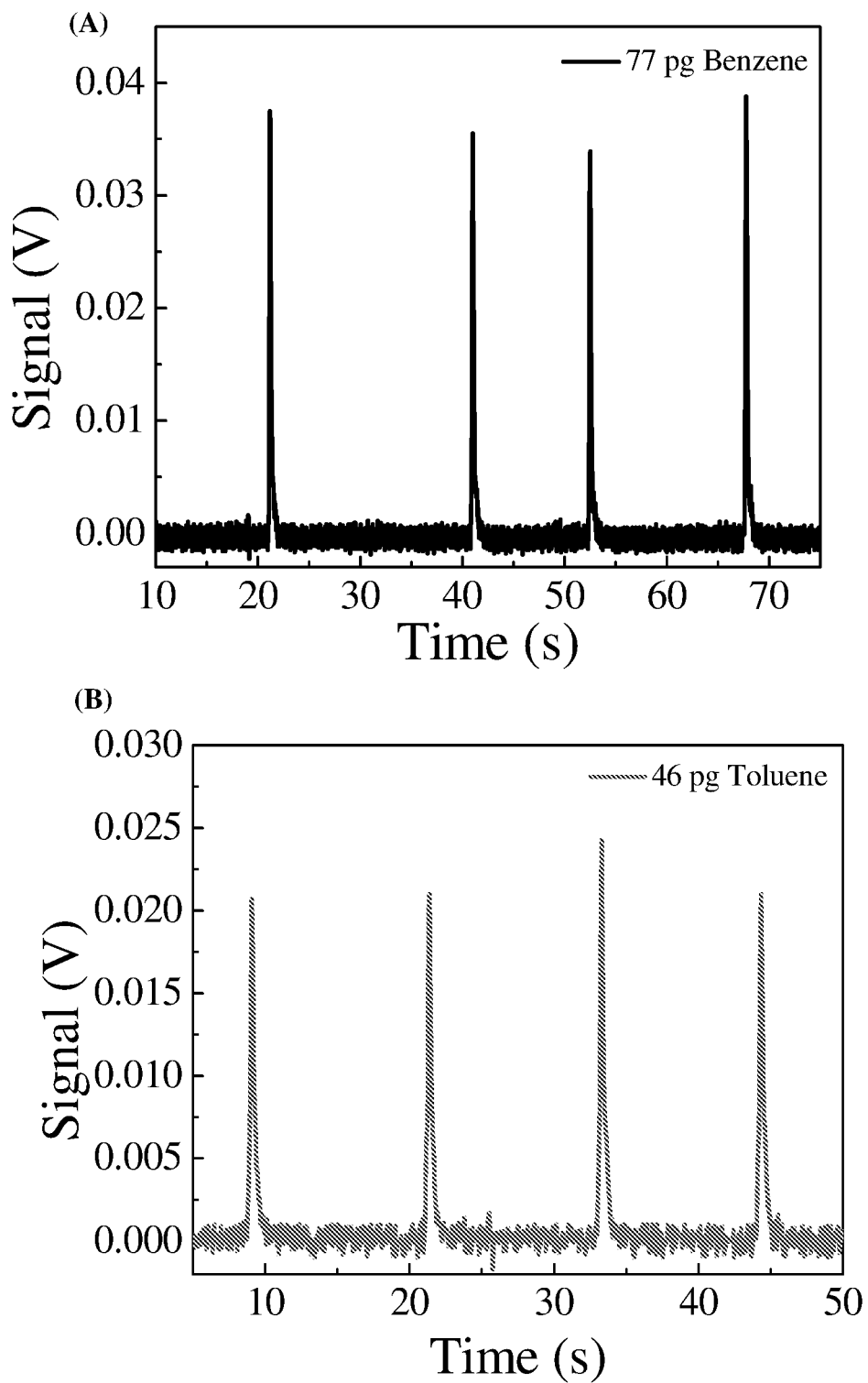
Figure 15C:
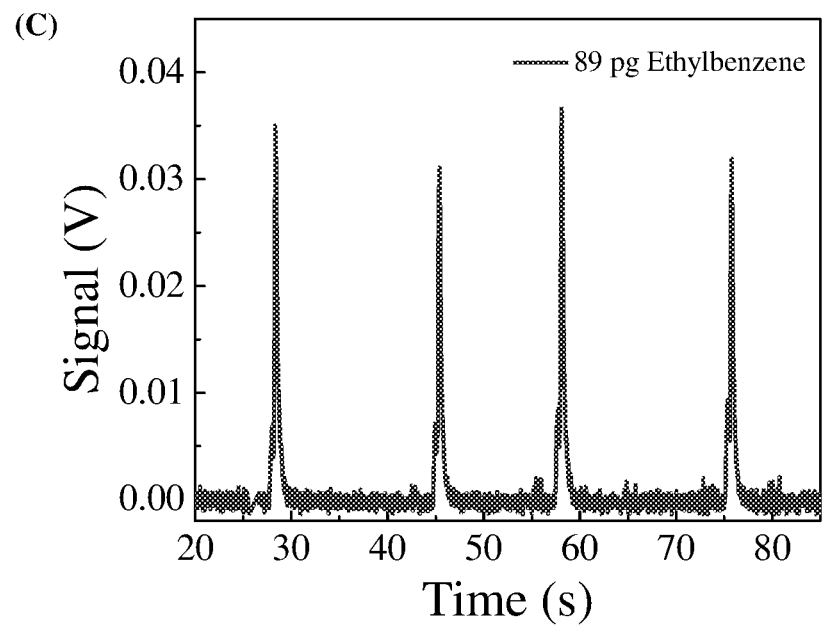
Figure 15D:
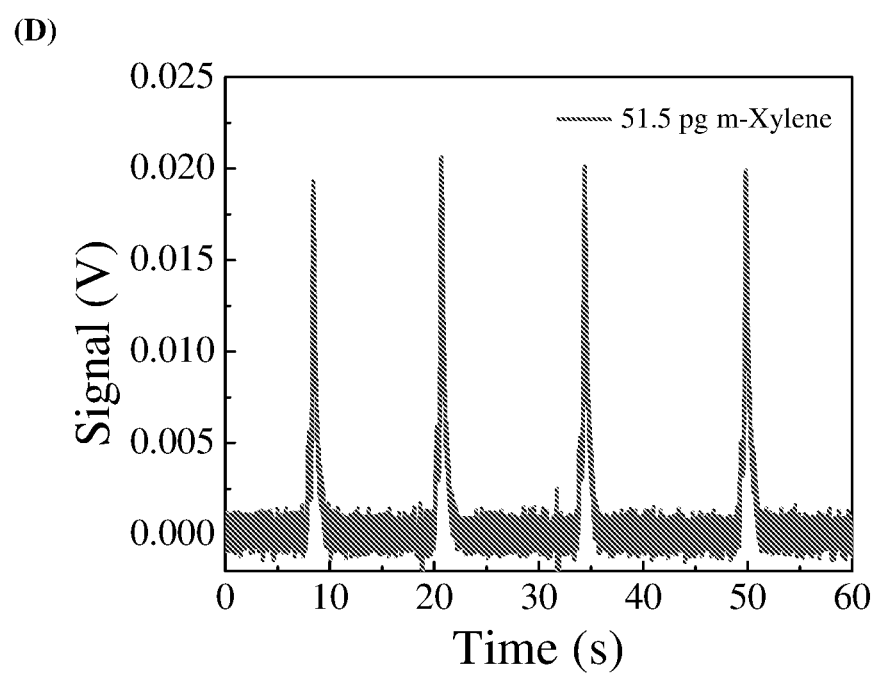
Figure 15E:
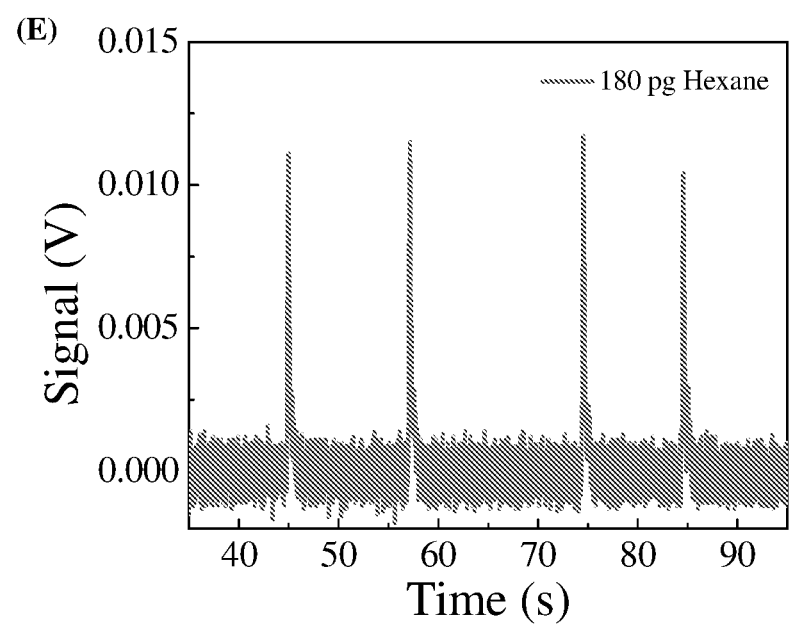

FIGS. 14A-14B show microfluidic PID detection according to certain aspects of the present disclosure where 9 VOCs are first separated by gas chromatography using a 6 meter long HP-5 column. Each VOC, along with the injected mass and FWHM, is as follows: 1. vinylchloride (2.1 ng, 0.6 s); 2. cis-1,2-dichloroethene (1.0 ng, 0.7 s); 3. benzene (1.2 ng, 0.7 s); 4. trichloroethylene (2.1 ng, 0.8 s); 5. toluene (1.5 ng, 0.9 s); 6. tetrachloroethylene (1.1 ng, 1 s); 7. chlorobenzene (1.0 ng, 1.2 s); 8. ethylbenzene (1.5 ng, 1.2 s); 9. m-xylene (1.5 ng, 1.3 s). Temperature ramping: T=40° C. for 0.2 minutes and then to 75° C. at a rate of 30° C./min. FIG. 14A shows helium and FIG. 14B shows dry air used as the carrier gas at a flow rate of 2.0 mL/min.

FIGS. 15A-15E show microfluidic PID chromatographic peak signals (V) versus time (seconds) from a GC-PID system according to certain aspects of the present disclosure repeated 4 times at the lowest injection mass for the five selected VOCs (benzene, toluene, ethylbenzene, m-xylene, and hexane) in FIG. 10.

Figure 16:
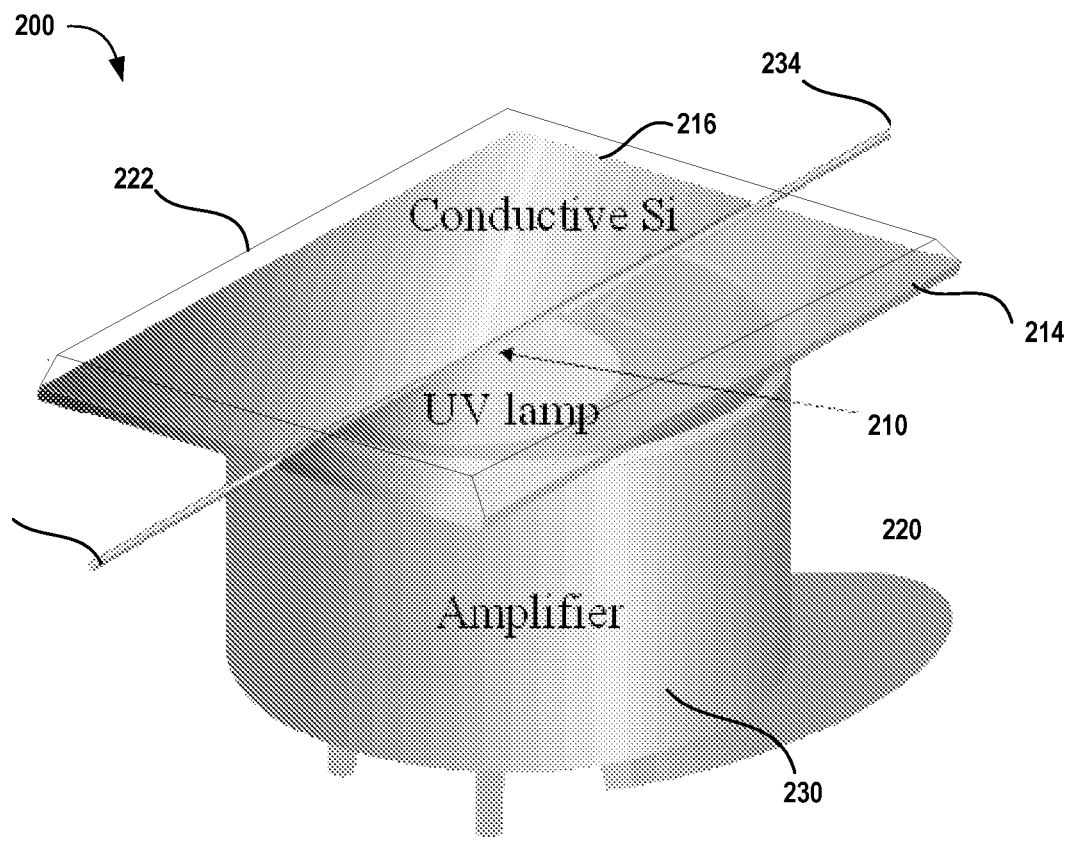

FIG. 16 is a schematic of a microfluidic photoionization detector (PID) device according to certain aspects of the present disclosure having a linear straight-line flow-through microfluidic channel.

Figure 17:
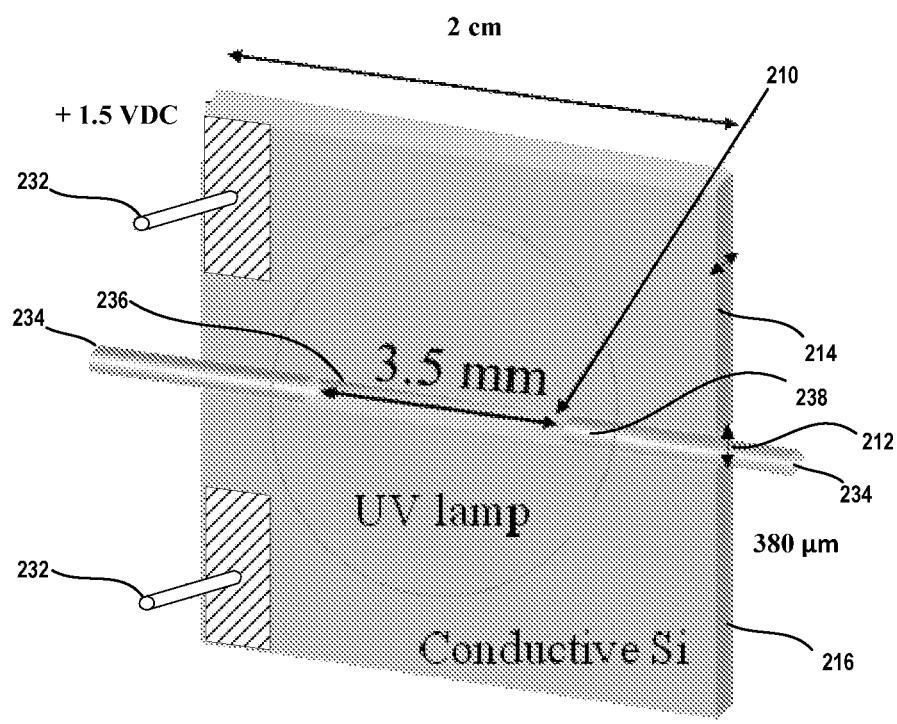

FIG. 17 is a detailed side view schematic of the linear straight-line flow-through microfluidic channel of the microfluidic photoionization device in FIG. 16.

Figure 18:
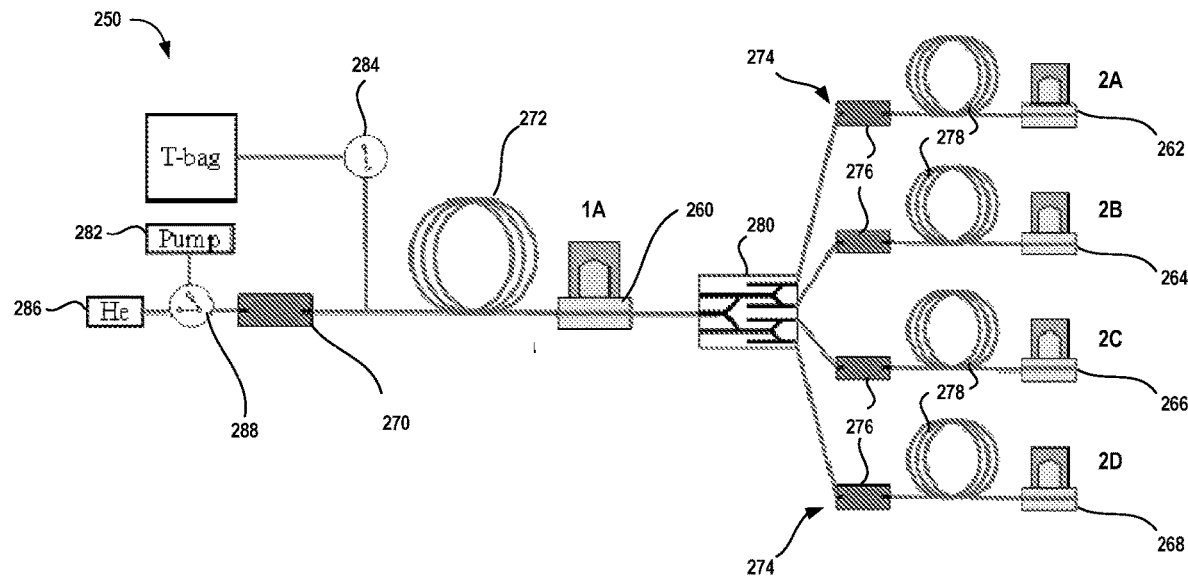

FIG. 18 is a schematic of a detection system having multiple photoionization detectors (PIDs), including a 1×4-channel array used to characterize and calibrate the responses of multiple PIDs in accordance with certain aspects of the present disclosure.

Figures 19A, 19B:
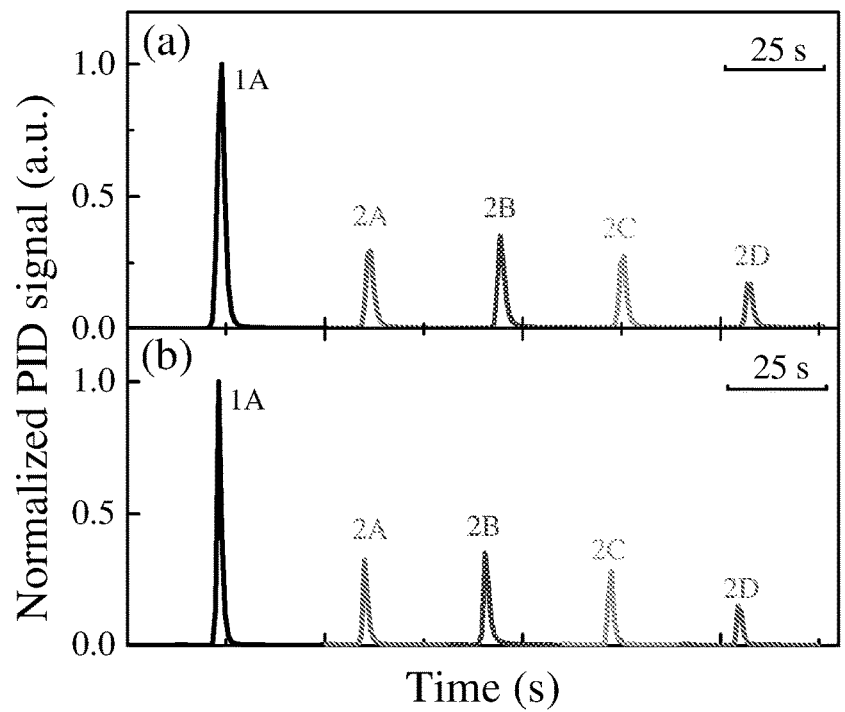

FIGS. 19(a)-19(b) show a response of five photoionization detectors (PIDs 1A, 2A-2D) from a detection system like that in FIG. 18 to 85 ng of ethylbenzene (FIG. 19(a)) and 92 ng of toluene (FIG. 19(b)). For comparison purposes, the peaks of PIDs 2A-2D are normalized to that of PID 1A for each analyte. Additionally, all the peaks are horizontally shifted for clarity. Therefore, the x-axis does not represent the retention time.

Figure 20:
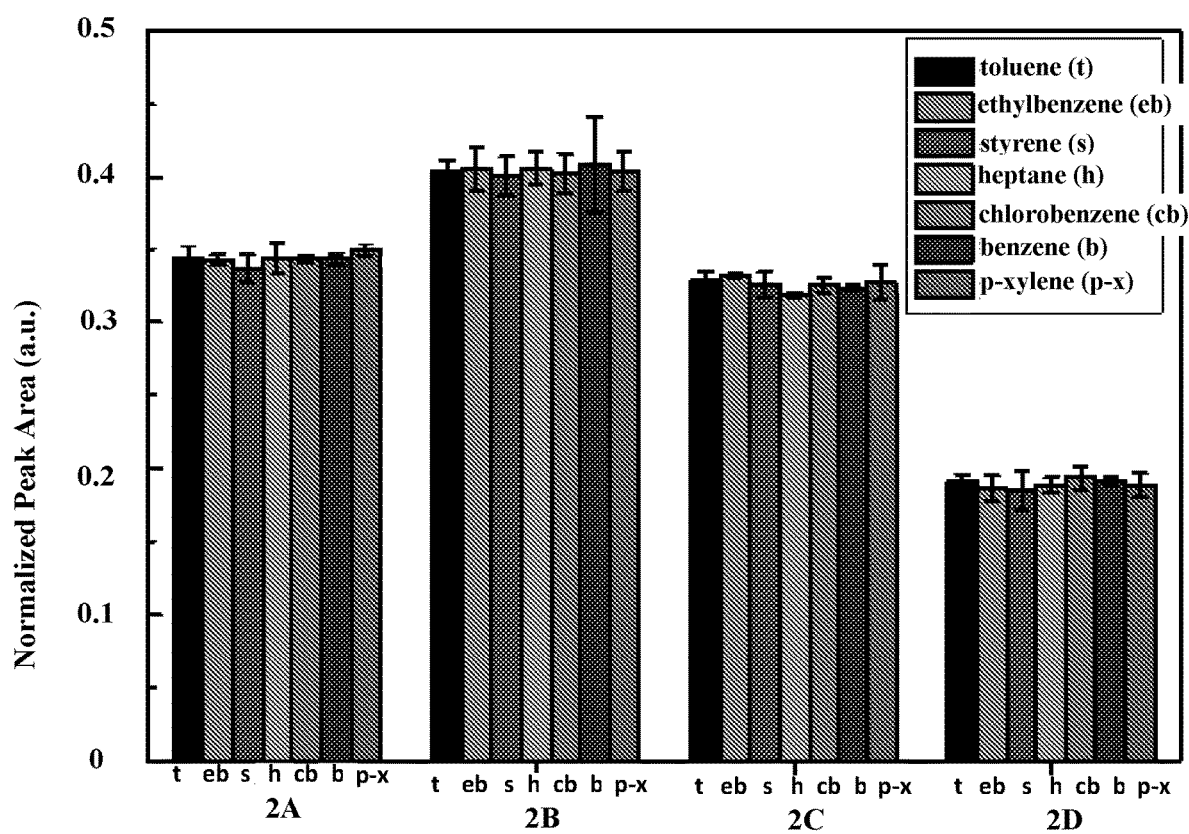

FIG. 20 shows a normalized peak area obtained for four photoionization detectors (PIDs 2A-2D) from a detection system like that in FIG. 18 for the following analytes: toluene (92 ng), ethylbenzene (85 ng), styrene (90 ng), heptane (83 ng), chlorobenzene (75 ng), benzene (80 ng) and p-xylene (80 ng). The peak areas are normalized to that of the reference photoionization detector (PID 1A) for each analyte. Error bars are obtained with 3 measurements. The related parameters for the analytes and PID calibration factors are given in Table 1.

Figure 21A:
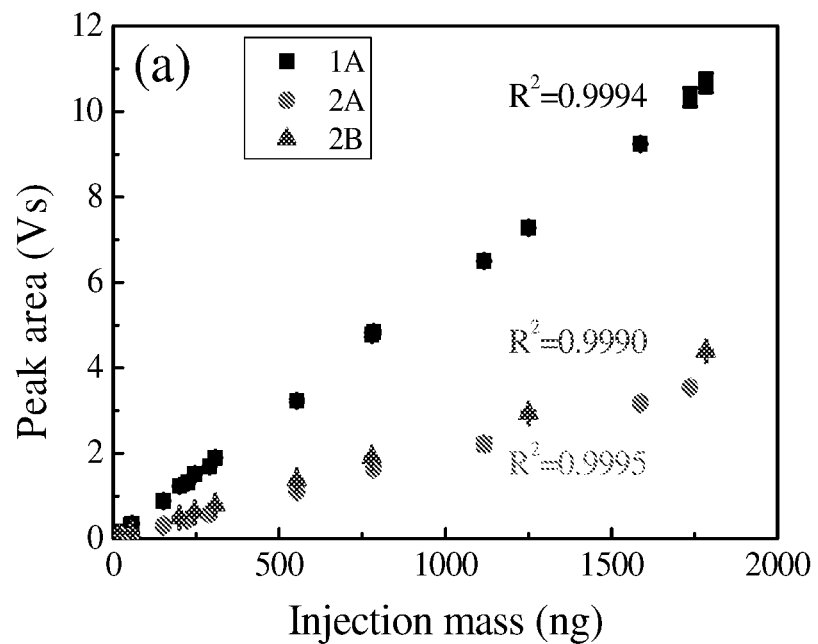
Figure 21B:
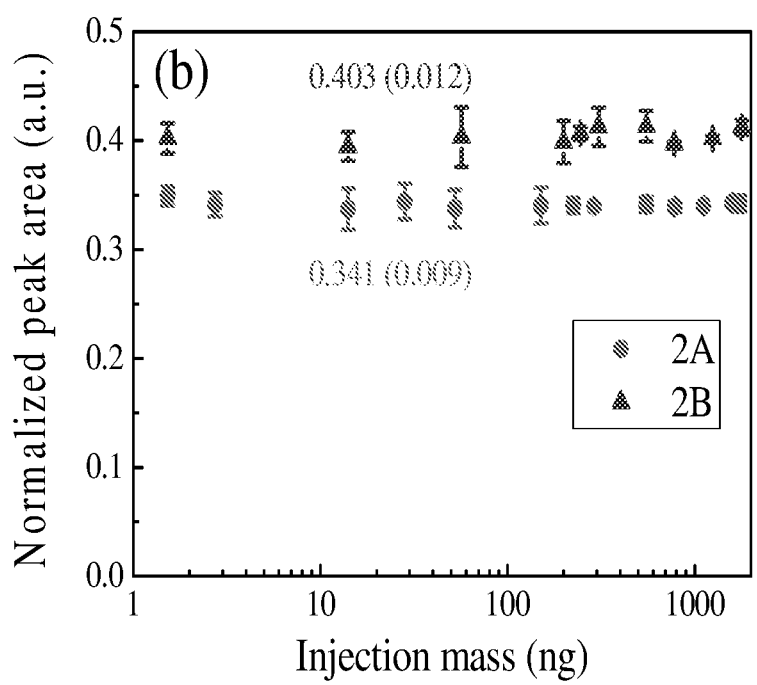

FIGS. 21(a)-21(b). FIG. 21(a) shows a peak area obtained with three photoionization detectors (PIDs 1A, 2A-2B) from a detection system like that in FIG. 18, as a function of injection mass of toluene on the linear-linear scale. Error bars are obtained with 3 measurements. FIG. 21(b) shows a peak area of PID 2A and PID 2B normalized to that of PID 1A extracted from FIG. 21(a). The calibration factor for each PID averaged among different concentrations and the associated standard deviation are labeled.

Figures 22A, 22B, 22C:
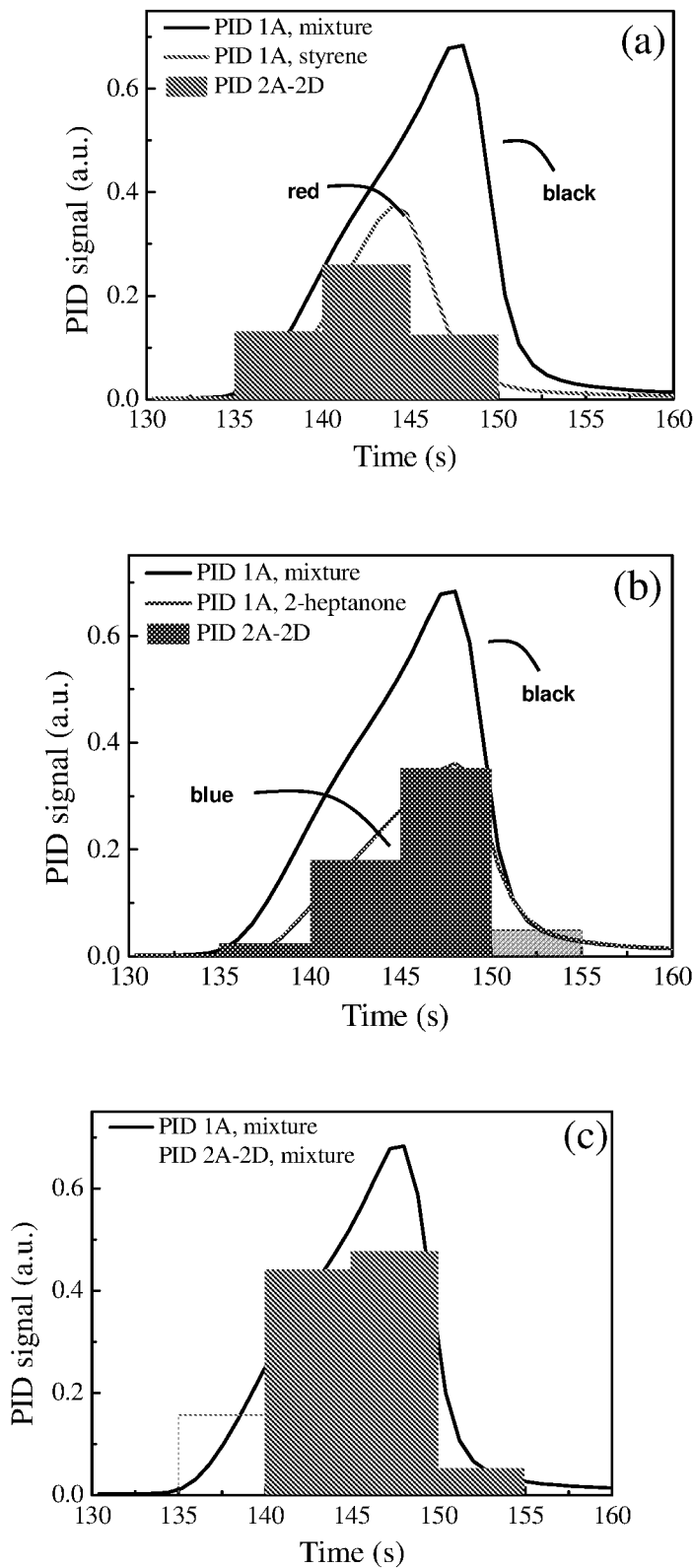
Figure 23:
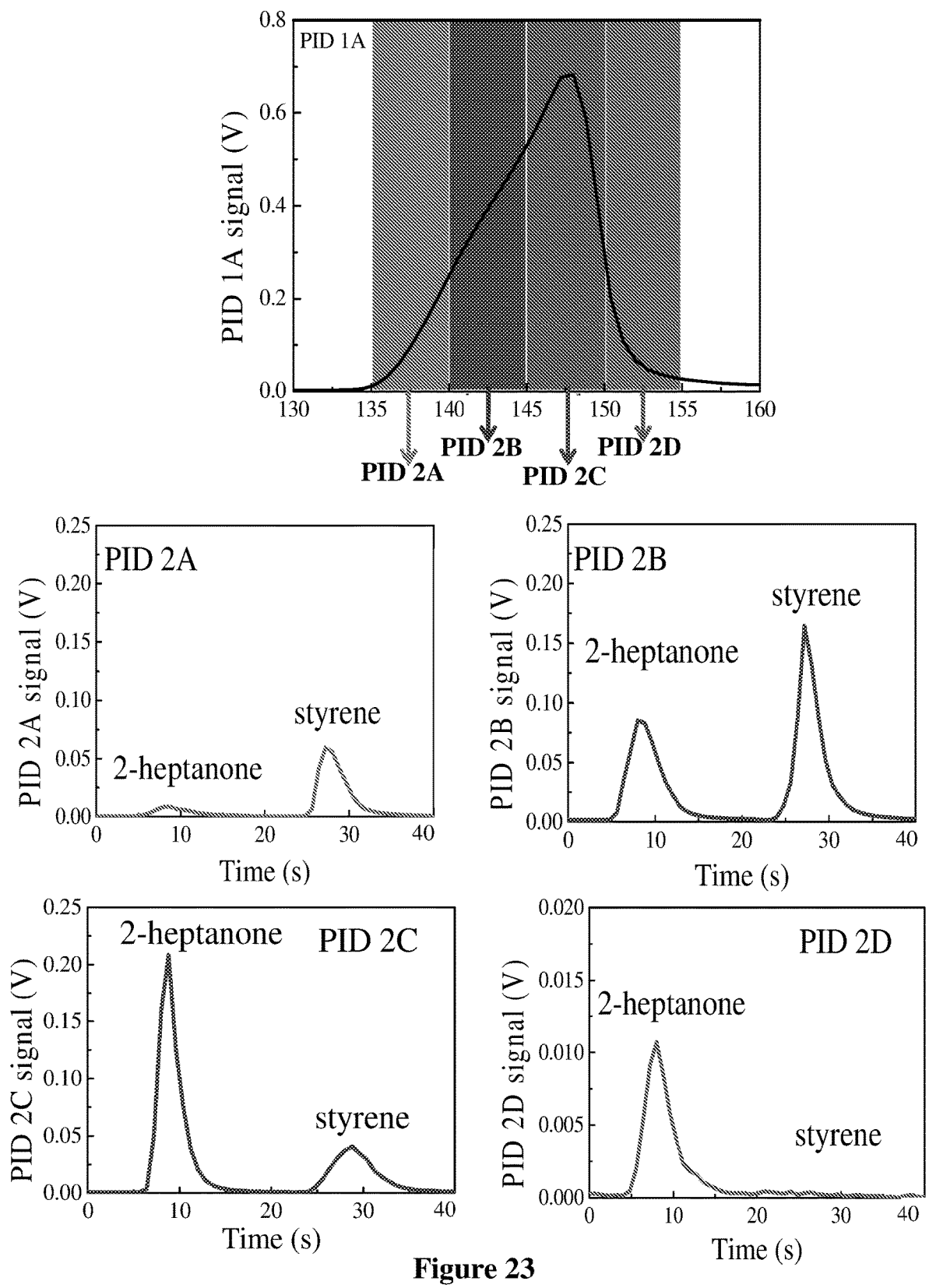

FIGS. 22(a)-22(c). FIG. 22(a) shows the coeluted peaks of a mixture of styrene (285 ng) and 2-heptanone (420 ng) obtained with a reference photoionization detectors (PID 1A—black curve) from a detection system like that in FIG. 18. The peak is reconstructed with the signals from four photoionization detectors (PIDs 2A-2D) from a detection system like that in FIG. 18 for styrene (red bars). The peak of styrene obtained with PID 1A is shown as a red curve, when it is injected individually at 285 ng. FIG. 22(b) shows coeluted peaks of a mixture of styrene (285 ng) and 2-heptanone (420 ng) obtained with reference photoionization detector PID 1A (black curve). The peak is reconstructed with the signals from PID 2A-2D for 2-heptanone (420 ng) (blue bars). The peak of 2-heptanone obtained with PID 1A is shown as blue curve, when it is injected individually at 420 ng. FIG. 22(c) shows the coeluted peak of a mixture of styrene (285 ng) and 2-heptanone (420 ng) obtained with reference photoionization detector PID 1A (black curve). Black bars are the summation red and blue bars in FIGS. 22(a) and 22(b). Details of routing the $1^{st}$ dimension eluent to the $2^{nd}$ dimension columns are illustrated in FIG. 23. Details of the peak areas are given in Table 2.

FIG. 23 shows a signal from reference photoionization detector (PID 1A) from a detection system like that in FIG. 18, when styrene (285 ng) and 2-heptanone (420 ng) are injected together, showing these two analytes coeluted from the $1^{st}$ dimension around 145 seconds. The routing system cuts the eluent into 4 slices, each of which has a 5-second window, and then sends them sequentially to each of the four $2^{nd}$ dimensional columns. (Bottom panel) Signals from four photoionization detectors (PIDs 2A-2D) show that styrene and 2-heptanone are separated in the $2^{nd}$ dimensional column, which allows reconstruction of the elution peaks in the $1^{st}$ dimensional separation.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters.

In addition, disclosure of ranges includes disclosure of all values and further divided ranges within the entire range, including endpoints and sub-ranges given for the ranges.

Systems using gas chromatography can be used to detect the presence of specific analyte compounds, such as VOCs or other compounds. In such systems, a vapor detector is used in conjunction with the GC column. A vapor sample to be analyzed is first introduced to a gas chromatography (GC) column. The sample is then transported through the column by an inert gas carrier and the sample is separated within the GC column according to physical properties of each compound (analyte) in the sample. Each eluted compound emerges from the GC column and enters the vapor detector unit. In other designs, the vapor detector unit may be used in intermediate positions within the GC column for detection of analytes.

Miniaturized versions of GC, e.g., micro-GC (μGC) are under intensive development for possible field-applications. An important component inside a μGC device is the vapor detector, which is required to be light in weight, small in footprint, rapid, sensitive, and able to operate using low power/voltage. In addition, non-destructive and flow-through characteristics are highly desirable for consecutive vapor analysis in multi-dimensional μGC without destroying analytes or GC elution profiles.

Conventional photoionization detectors (PID) are often used with GC systems to detect the presence of specific analyte compounds. In such a GC-PID system, a vapor sample to be analyzed is first introduced to a gas chromatography (GC) column. The sample is then transported through the column by an inert gas carrier and the sample is separated within the GC column according to physical properties of each compound (analyte) in the sample. Each eluted compound emerges from the GC column and enters the photoionization detector.

A conventional PID typically uses high energy photons (e.g., in the ultraviolet (UV) wavelength range) to disassociate the eluted analyte molecules into positively charged ions. Often the PID uses a discharge gas, such as an inert gas (such as helium) that is ionized in a discharge lamp chamber. A UV lamp applies UV energy that may be absorbed by the discharge gas so that the atoms in the discharge gas transition to an exited state. In the discharge chamber, each ion can combine with another atom to emit one or more photons. Eluted compounds enter the PID device in an ionization chamber. The ionization chamber and discharge lamp chamber are typically separated from one another via an optically transparent window comprising magnesium fluoride. The ionization chamber containing the eluted compounds is then bombarded by the photons generated by the ionized discharge gas from the discharge lamp chamber.

The photons/energy is then absorbed by the analyte molecules that transition to an exited state and ionize in the separate ionization chamber, ultimately forming positively charged ions. Thus, based on relative retention time in the GC column, different analyte molecules in the sample are separated, elute at different times, and then enter the chamber, where they become ionized from photons emitted from the ionized discharge gas.

The gas thus becomes electrically charged and the ions produce an electric current, which becomes an output related to concentration of the analyte molecules ionized. As each ionized compound passes one or more collecting electrodes adjacent to the ionizing chamber, an electrical current is generated. In this manner analyte compounds can be identified based on both retention time and each compound's ionization potential (IP). PIDs are desirable for having high sensitivity to analytes, large dynamic range, and providing non-destructive vapor detection. However, conventional PIDs also suffer from significant drawbacks, including having a tardy response or lag, which results from both a relatively large ionization chamber and dead volume, and requiring high power levels for operation.

A typical commercial PID has an ionization chamber volume of 40-200 μL with the dead volume being ¼-⅙ of the chamber volume. The corresponding response time is on the order of a few seconds. However, while sharp peaks can be generated at an extremely high flow rate (30 mL/min) or using make-up gas (20 mL/min) rates, neither of these is desirable for a GC or μGC system due to complicated fluidic design and/or significant reduction in sensitivity. Recently, improvement in the chamber design was made to reduce the chamber volume to a size of 10 μL. 30 milliseconds response time (defined as the time from the bottom to 90% of peak height) or FWHM (full-width-at-half-maximum) of 45 milliseconds was achieved with a flow rate of 30 mL/min. However, the response speed is still limited by the relatively large chamber (and the dead volume as well), which becomes problematic at low flow rates typically used in μGC.

For example, the chamber volume alone can lead to a peak broadening of 600 milliseconds for a 1 mL/min flow rate, not to mention the additional broadening from the associated dead volume, for which the effective flow rate would be much lower. In order to achieve rapid response, a small ionization chamber volume and a small dead volume are needed. Unfortunately, a small chamber always comes at the expense of the size of the electrode (corresponding to ion collection efficiency) and UV illumination cross section (corresponding to ionization efficiency), which reduces the sensitivity of the PID.

The present disclosure addressed these issues and provides a flow-through and highly sensitive microfluidic photoionization detector (PID) device. Such a microfluidic PID device can be micro-fabricated directly onto a substrate, such as a conductive silicon wafer, with an Archimedean spiral channel in certain variations. Further, such a microfluidic PID device prepared in accordance with certain aspects of the present disclosure can be operated with low voltage (<10-20 VDC, over 10 times lower than that used in a regular PID). In certain variations, the microfluidic PID has a significantly reduced ionization chamber volume of only 1.3 μL, nearly 10 times smaller than any state-of-the-art PIDs and over 100 times smaller than commercial PIDs.

Moreover, in certain aspects, a PID device prepared in accordance with the present disclosure has virtually zero dead volume (in certain variations, only about 2 nL) owing to its flow-through design. Consequently, the response time of microfluidic PIDs prepared in accordance with the present teachings can be considerably shortened, ultimately limited by its residence time (7.8 milliseconds for 10 mL/min and 78 milliseconds for 1 mL/min). Experimentally, the microfluidic PID response according to certain aspects of the present disclosure is found to be the same as the standard flame ionization detector (FID) with the peak FWHM of 0.25 seconds and 0.085 seconds for a flow rate of 2.3 mL/min and 10 mL/min, respectively.

As described further herein, the microfluidic PID according to certain variations of the present disclosure can detect analytes down to the pico-gram level (at 3 standard deviations) due to the large UV illumination area and electrode area. A linear dynamic range of six orders of magnitude is achieved in certain aspects owing to more uniform and sufficient UV ionization. Finally, because of the very short distance between the electrodes, only 6 VDC was needed for microfluidic PID operation. Detailed comparison among conventional micro-PID, conventional micro-discharge PID, and a microfluidic PID prepared in accordance with certain aspects of the present disclosure is given in Table 1.

TABLE 1

| Device | μPID† | Plasma-based PID‡ | Inventive Microfluidic PID |
| --- | --- | --- | --- |
| Design concept | Traditional design concept, but with a smaller chamber volume (10 μL) | New concept with micro-discharge integrated on a chip | New microfluidic flow-through concept. Low chamber volume and dead volume. Large electrode area. Low voltage |
| Ionization source | UV lamp on top of the ionization chamber (10.6 eV) | UV + Plasma* (~20 eV) | UV lamp on top of the ionization channel (10.6 eV) |
| Discharge electrode degradation | No | No (according to 12-hr continuous testing) | No |
| Source/analyte contact | Non-contact* | Contact | Non-contact* |
| External helium flow required | No* | Yes | No* |
| High voltage required | Yes (150 V) | Yes (>500 V) | No* (6 V) |
| Power consumption | ~100 mW (mainly for VUV operation) | 1.4 mW* | ~100 mW (mainly for VUV operation) |
| Detection limit | 5 ppb for benzene, toluene, and styrene (no mass detection limit reported) | ~10 pg for n-Octane | ~5 pg for benzene, toluene, ethylbenzene, and m-xylene |

TABLE 1-continued

| Device | μPID† | Plasma-based PID‡ | Inventive Microfluidic PID |
|---|---|---|---|
| Chamber size | 10 μL | Not reported | 1.3 μL* |
| Response time (baseline to 90% of the peak) | 30 ms for 30 mL/min flow rate | 170 ms for 2.5 mL/min flow rate | 160 ms and 55 ms for 2.3 and 10 mL/min flow rate, respectively |
| Dynamic range | 6 orders of magnitude | Not reported | 6 orders of magnitude* |
| Linearity | Non-linear (square root) | Not reported | Linear* |
| Integration with μGC systems | Acceptable | Best* | Better |
| Temperature stability | Not reported | Not reported | Tested (20-60° C.)* |
| Flow rate stability | Not reported | Not reported | Tested* (2.3-10 mL/min) |
| Undesirable negative peaks in signal | Not present* | Present (reasons unknown) | Not present* |

*represents advantageous or preferred non-limiting features.
†μPID device as reported in Sun et al., "An improved photoionization detector with a micro gas chromatography column for portable rapid gas chromatography system," Sens. Actuators B. 188, pp. 513-518 (2013), the relevant portions of which are incorporated herein by reference.
‡Plasma-based PID device as reported in Akbar, et al. H. Shakeel, and M. Agah, "GC-on-Chip: Integrated Column and Photo Ionization Detector," Lab Chip (2015, DOI: 10.1039/C4LC01461H), the relevant portions of which are incorporated herein by reference.

The present disclosure thus provides a microfluidic photoionization detector (PID) comprising a microfluidic channel having an inlet that receives a fluid sample and an outlet from which the fluid sample exits the microfluidic channel. The microfluidic channel can be formed in or on a substrate, as will be described further below. A microfluidic channel is a microchannel formed in or on a substrate that has a cross-sectional area and volume sufficient to permit the microfluidic channel to receive, transfer, and/or store materials, including fluids. Fluids include gases, vapors, liquids, and the like. Thus, a microfluidic channel generally has dimensions such that the length of the structure forms the greatest dimension, for example, a groove (an open shape) or channel (a structurally closed geometry). In certain variations, the microfluidic channels may be fully enclosed structures defining a void region that permits fluid communication therethrough, as described further herein. The microfluidic channels may have a variety of cross-sectional shapes, including circular, round, or oval (forming a tube or cylindrical shape), rectangular, and the like.

In various aspects, the disclosure provides methods of forming and devices having features or channels that are on a microscale. In some aspects, the channel is optionally smaller than a microscale, such as a nanoscale structure. As used herein, "microscale" refers to a structure having at least one dimension that is less than about 500 μm, optionally less than about 400 μm, optionally less than about 300 μm, optionally less than about 200 μm, optionally less than about 150 μm, and in certain variations, optionally less than about 100 μm. A "nanoscale" structure has at least one dimension that is less than or equal to about 50 μm, optionally less than or equal to about 10 μm (10,000 nm), optionally less than or equal to about 1 μm (1,000 nm), optionally less than or equal to about 0.1 μm (100 nm), optionally less than about 50 nm, and optionally less than about 10 nm. As used herein, reference to a microscale, microchannel, microfluidic channel, or microstructure, encompasses smaller structures, such as the equivalent nanoscale structures.

The microfluidic channel of the photoionization detector (PID) according to certain aspects of the present disclosure defines a serpentine pattern on the substrate. By serpentine it is meant that the fluidic channel is a flow-through design that winds and has at least two 180° changes in direction through the course of the fluid path. The fluid pathway defined by the microfluidic channel is thus curved in several, but in preferred aspects, avoids changes in direction that result in dead zones or diminished fluid flow. Such a serpentine path may define a spiral structure or an interdigitated type structure. One preferred variation is where the microfluidic channel defines an Archimedean spiral. In other variations, the microfluidic channel may have other flow path configurations, including linear straight-line flow paths.

The microfluidic channel can be formed in or on a substrate. The substrate may be formed of an inorganic material or a polymer. In certain aspects, the substrate may be glass (e.g., silica or borosilicate). As will be described in greater detail below, in certain variations, the substrate may have one or more layers formed thereon. Thus, at least one layer may comprise an electrically conductive material. The electrically conductive material may be formed of a conductive material or a semiconductor material (such as a doped semiconductor material). In certain aspects, the electrically conductive material comprises a material selected from the group consisting of: silicon (Si) (e.g., doped silicon), aluminum (Al), indium-tin-oxide (ITO), gold (Au), silver (Ag), platinum (Pt), iridium (Ir), palladium (Pd), tungsten (W), stainless steel (SS), zinc (Zn), titanium (Ti), their alloys and oxides and combinations thereof. In certain variations, the substrate comprises a plurality of layers. At least two of the layers of the plurality may have distinct compositions. For example, a first layer on the substrate may comprise a doped semiconductor material, such as doped silicon, and a second layer overlying the first layer may comprise an electrically conductive metal.

The layers can be removed in select regions in a pattern that forms the microfluidic channel. The microfluidic photoionization detector (PID) further includes a first electrode and a second electrode of opposite polarity. For example, the microfluidic photoionization detector (PID) may have a first electrode region and a distinct second electrode region defined on the substrate. The first electrode region and the second electrode region may be formed in select regions of the one or more layers on the substrate. In certain variations, the substrate comprises select regions having a first layer of doped silicon and a second layer of electrically conductive metal, wherein the select regions are distinct regions that correspond to the respective first electrode region and the second electrode region. The first electrode region may be separated and electrically isolated from the second electrode region by the microfluidic channel. The microfluidic channel may be formed in the one or more layers and thus separate and define the first electrode region and the second electrode region. The first electrode region and the second electrode region can be connected to an external positive and negative lead of a power source. The electrodes thus provide the ability to measure electric signals generated by ionized analytes within the microfluidic channel as they are bombarded with and excited by photons.

The microfluidic photoionization detector (PID) device also includes a source of light. As discussed above, the light source generates light or electromagnetic radiation within the lamp and then photons, which are directed towards the contents of the microfluidic channel. Particularly suitable light falls within the ultraviolet electromagnetic radiation spectrum. In certain variations, the light may be ultraviolet radiation (UV) (including ultraviolet A, ultraviolet B, ultraviolet C, near ultraviolet, middle ultraviolet, far ultraviolet, extreme ultraviolet, and vacuum ultraviolet) having a wavelength of greater than or equal to about 10 nm to less than or equal to about 400 nm. In still other variations, the light may be ultraviolet radiation in a range of greater than or equal to about 100 nm to less than or equal to about 400 nm (including ultraviolet A, ultraviolet B, ultraviolet C). Notably, the light may filtered light, focused light, polarized light, or may be extra-spectral or a mixture of different wavelengths. The source of UV light may be a UV lamp that has a transparent window (to UV light and photons generated within the lamp). The lamp may be considered to be a discharge chamber in the PID device and may contain an inert noble gas, such as krypton (Kr). The transparent window may comprise magnesium fluoride ($MgF_2$).

The transparent window of the UV light source may be disposed over the microfluidic channel, beneath the microfluidic channel, or along a side of the microfluidic channel. In certain designs, the transparent window of the UV light source may be placed over at least a portion of the microfluidic channel, thus forming an upper or top wall (e.g., a fourth side of a three-side channel) to enclose the microfluidic channel. However, the transparent window need not contact the microfluidic channel, but may instead be positioned near the microfluidic channel and leave a small gap, for example, positioned less than a few millimeters to less than about 10 μm away from the microfluidic channel. Thus, the source of UV light is positioned and configured to direct photons to the sample fluids that may be present within the microfluidic channel. The microfluidic channel thus serves as an ionization chamber for the analyte compounds present and flowing within the microfluidic channel.

In certain variations, the microfluidic channel (or ionization chamber) has a total volume of less than or equal to about 10 μL. In certain preferred aspects, less than or equal to about 9 μL, optionally less than or equal to about 8 μL, optionally less than or equal to about 7 μL, optionally less than or equal to about 6 μL, optionally less than or equal to about 5 μL, optionally less than or equal to about 4 μL, optionally less than or equal to about 3 μL, optionally less than or equal to about 2 μL, and in certain variations, optionally less than or equal to about 1.5 μL. For example, in one variation, the microfluidic channel defines an ionization chamber volume of only about 1.3 μL.

Furthermore, in certain aspects, the microfluidic photoionization detector (PID) device has negligible dead volume within the microfluidic channel pathway. The dead volume of the microfluidic channel may be less than or equal to about 1% of a total volume of the microfluidic channel, for example, where a total volume of the microfluidic chamber is 5 μL, a dead volume of less than or equal to 1% would be a dead volume of less than or equal to about 0.05 μL or 50 nL. In certain other variations, the dead volume of the microfluidic channel may be less than or equal to about 0.9% of a total volume of the microfluidic channel, optionally less than or equal to about 0.7% of a total volume of the microfluidic channel, optionally less than or equal to about 0.9% of a total volume of the microfluidic channel, and in certain variations, less than or equal to about 0.5% of a total volume of the microfluidic channel. In certain other variations, the dead volume of the microfluidic channel may be less than or equal to about 30 nL, optionally less than or equal to about 25 nL, optionally less than or equal to about 15 nL, optionally less than or equal to about 10 nL, optionally less than or equal to about 5 nL, optionally less than or equal to about 4 nL, optionally less than or equal to about 3 nL, and in certain variations, optionally less than or equal to about 2 nL.

A microfluidic channel may have a width of greater than or equal to about 50 μm to less than or equal to about 200 μm, optionally greater than or equal to about 100 μm to less than or equal to about 200 μm, and in certain aspects, optionally greater than or equal to about 125 μm to less than or equal to about 175 μm. In certain other variations, the microfluidic channel has a height or depth of greater than or equal to about 100 μm to less than or equal to about 600 μm, optionally greater than or equal to about 200 μm to less than or equal to about 500 μm, optionally greater than or equal to about 300 μm to less than or equal to about 400 μm, and in certain aspects, optionally greater than or equal to about 350 μm to less than or equal to about 400 μm. A total length of the microfluidic channel may be greater than or equal to about 0.5 cm to less than or equal to about 10 cm, optionally greater than or equal to about 1 cm to less than or equal to about 5 cm, and in certain aspects, optionally greater than or equal to about 2 cm to less than or equal to about 3 cm. A thickness of a wall (e.g., between respective passes adjacent to one another in the microfluidic channels may be greater than or equal to about 10 μm to less than or equal to about 100 μm, optionally greater than or equal to about 25 μm to less than or equal to about 75 μm, and in certain aspects, optionally greater than or equal to about 40 μm to less than or equal to about 60 μm. In one embodiment, a microfluidic channel has a cross section of 150 μm (width)×380 μm (depth), a wall thickness of 50 μm, and a length of 2.3 cm.

A microfluidic photoionization detector (PID) device prepared in accordance with certain aspects of the present disclosure is a low voltage device that can be operated with low voltages, for example, less than or equal to about 20 volts direct current (VDC), optionally less than or equal to about 15 VDC, optionally less than or equal to about 10 VDC, optionally less than or equal to about 9 VDC, optionally less than or equal to about 8 VDC, optionally less than or equal to about 7 VDC, and optionally less than or equal to about 6 VDC. For example, because of the very short distance between the electrodes in the PID device, in certain variations, only 6 VDC are needed for operating.

Notably, the PID system may also include a data processing system, an external power source and delivery system, a fluid pump, and other associated components and equipment typically used with PID systems. As discussed above, the PID system provided by the present disclosure may be connected to or associated with a gas chromatography or micro-gas chromatography system.

PIDs prepared in accordance with the present teachings can have relatively short distances, depending on residence time. Exemplary residence times ($t_{residence}$) in the PIDs may range from 7.8 milliseconds for a sample fluid flow rate of 10 mL/min to 78 milliseconds for a sample fluid flow rate of 1 mL/min. The microfluidic PID response according to certain aspects of the present disclosure is found to be the same as the standard flame ionization detector (FID) with the peak FWHM (full-width-at-half-maximum) of about 0.25 seconds and 0.085 seconds for a fluid sample flow rate of 2.3 mL/min and 10 mL/min, respectively.

The response time of a PID, represented by tPID, which contributes to GC peak broadening, is mainly governed by its ionization chamber volume and dead volume as follows:

$$(t_{PID})^2 \approx (t_{residence})^2 + (t_{dead})^2 = \left(\frac{V_{flow}}{F}\right)^2 + \left(\frac{V_{dead}}{F'}\right)^2,$$

where $t_{residence}$ is the analyte residence time for the majority of an analyte to flow through the PID chamber and $t_{dead}$ represents the residual time that is needed for the analyte in the dead volume to be swept out of the PID. $V_{flow}$ and $V_{dead}$ are the chamber flow volume (i.e., the volume in the ionization chamber swept by the mobile phase) and dead volume (i.e., the volume in the ionization chamber not swept by the mobile phase), respectively. $V_{flow}+V_{dead}$=total ionization chamber volume. F and F' are the volumetric flow rate for the analyte residing in the chamber flow volume and the dead volume, respectively. For a non-flow-through PID design, the dead volume is usually ⅙-¼ of the chamber volume and is responsible for the tailing effect in GC peaks. While $t_{dead}$ is difficult to estimate, $t_{residence}$ for various PID designs can easily be calculated, as presented in Table 2 below. Table 2 shows a comparison of analyte residence time for a comparative commercial PID, a comparative state-of-the-art PID, and a microfluidic PID according to the present disclosure

TABLE 2

| Chamber volume | Commercial PID (100 µL) | State-of-the-art PID (10 µL) | Microfluidic PID (1.3 µL) |
|---|---|---|---|
| $t_{residence}$ for 1 mL/min | 6 s | 0.6 s | 0.078 s |
| $t_{residence}$ for 5 mL/min | 1.2 s | 0.12 s | 0.016 s |

The PID response time is ultimately limited by its chamber volume (assuming the dead volume is zero). FIGS. 13A-13D and FIG. 12 plot the COMSOL simulation results for various chamber sizes and the corresponding fall time in PID response. It is clearly shown that a small chamber size and a good fluidic design can significantly improve the PID response time.

The current signal generated by a PID, i, can be expressed as:

$$i \propto C \cdot I_0 \sigma_i [AB],$$

where $I_0$ is the vacuum ultraviolet (VUV) photon flux (in units of number of photons per m² per second), A is the effective VUV radiation area of an ionization chamber, $\sigma_i$ is the ionization cross section, [AB] is the analyte concentration, and C is the ion/electron collection efficiency at electrodes. For a given analyte concentration and a given VUV light source, $I_0$, $\sigma_i$, and [AB] are fixed; therefore i is linearly proportional to the radiation area. Usually the VUV light source has a relatively large output diameter (e.g., 3.5 mm for the lamp used in the examples). However, in order to decrease the chamber volume for a faster response, the effective radiation area in the traditional PID design is significantly reduced, and therefore, the VUV lamp is significantly underutilized. In addition, in order to increase the ion collection efficiency, a relatively high voltage (a few hundreds of volts) is needed to reduce the ion recombination and quenching that adversely impact the detection signal.

In contrast, in certain embodiments, the inventive microfluidic PID designs use a serpentine channel that reduces the chamber volume and eliminates dead volume while maintaining a large VUV illumination area. Furthermore, the ion collection efficiency is improved due to a significantly reduced distance between the two electrodes and increased the electrode area. The short distance increases the electric field strength for a given applied voltage and reduces ion recombination and quenching. Consequently, the microfluidic PID can be operated at low voltages, for example, at only 6 VDC. In addition, due to the short VUV illumination path, the analyte at different depths can be ionized more uniformly to ensure detection linearity.

Figure 1:
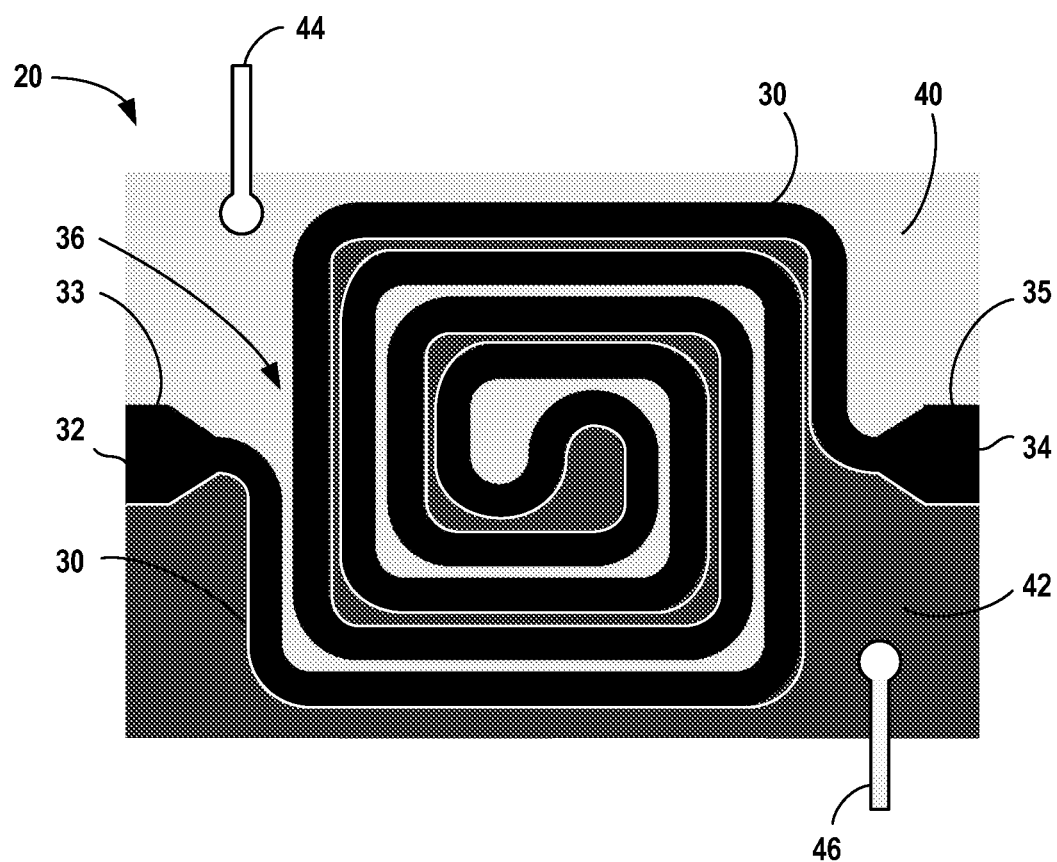
FIG. 1 shows a schematic plan view of a portion of a microfluidic photoionization detector (PID) device according to certain aspects of the present disclosure.

FIG. 1 shows a schematic plan view of a portion of an exemplary microfluidic photoionization detector (PID) device 20 according to certain variations of the present disclosure. More specifically, the PID device 20 has a microfluidic channel 30 with a serpentine Archimedes spiral shape. The microfluidic channel 30 has an inlet 32 and an outlet 34. Inlet 32 has a first widened trapezoidal shaped region 33, while outlet 34 has a second widened trapezoidal shaped region 33 to reduce the dead volume. In the central region 36 of the spiral, the microfluidic channel 30 has a uniform and reduced cross-sectional area as compared to the first widened trapezoidal shaped region 33 and the second widened trapezoidal region 35. This microfluidic channel 30 thus has a flow-through design.

The PID device 20 further has a first electrode region 40 and a distinct second electrode region 42. The first electrode region 40 is electrically and physically separated from the second electrode region 42 by the microfluidic channel 30. A first electrical connector 44 is in electrical communication with the first electrode region 40 and an external power source (not shown). Likewise, a second electrical connector 46 is in electrical communication with the second electrode region 42 and the external power source.

Figure 2:
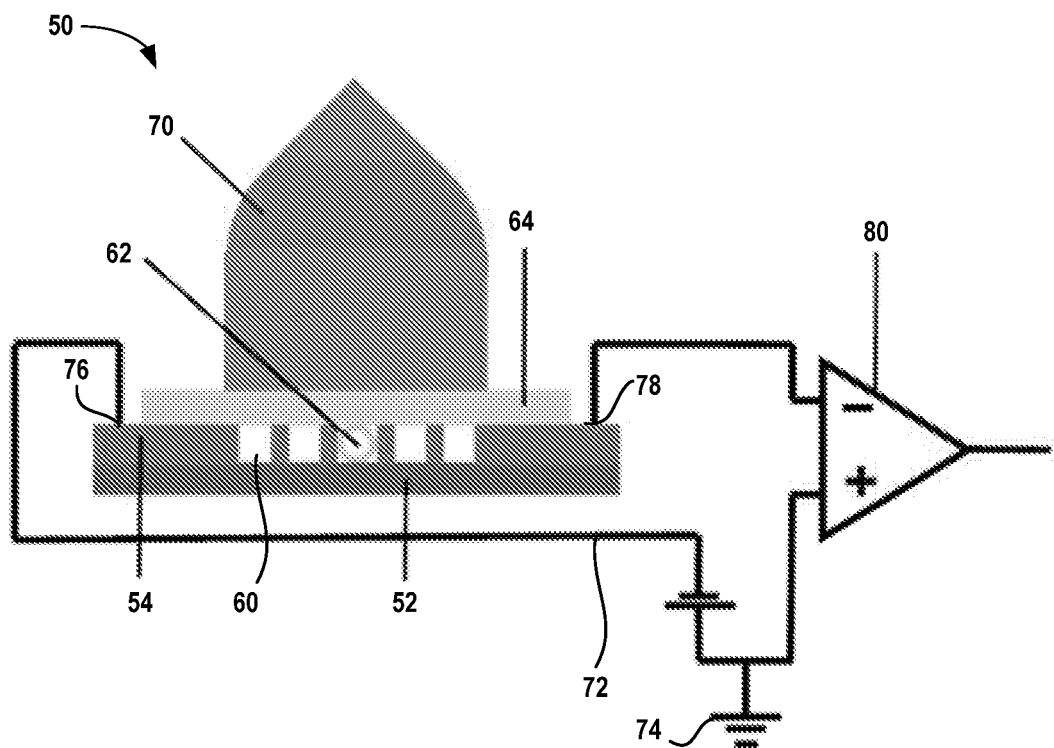
FIG. 2 shows a schematic of a partial sectional side view of a portion of a microfluidic photoionization detector (PID) device according to certain aspects of the present disclosure.

FIG. 2 shows a schematic of a partial sectional side view of a portion of a microfluidic photoionization detector (PID) device 50 according to certain aspects of the present disclosure. A substrate 52 (e.g., formed of PYREX™ glass) has at least one layer of electrically conductive material 54 (e.g., a conductive silicon material) formed thereon. A microfluidic channel 60 defines a plurality of rows in the spiral pattern. From the view shown, an inlet 62 to a gas chromatography column (not shown) can be seen, although an outlet is not shown in FIG. 2. A plate or transparent window 64 (e.g., formed of $MgF_2$) is disposed over the layer of electrically conductive material 54, so as to enclose the top side of the microfluidic channel 60. A vacuum ultraviolet (VUV) lamp 70 is disposed over the transparent window 64.

In order to power the VUV lamp 70, a power drive circuit 72 connected to a power source 74 is provided. The power drive circuit is connected to the electrically conductive material 54 in a first region to define a first electrode 76 and also to a second distinct region to define a second electrode 78 with opposite polarity. The first and second electrodes 76, 78 are also connected to an amplifier 80 to form a closed circuit. Based on the PID theory, the PID signal is directly generated from the charges on photoionized molecular fragments from the test sample fluid passing within the microfluidic channel 60 that produce current between the electrodes 76, 78. According to Ohm's law, the final voltage signal is proportional to the current signal across the internal resistance of the amplifier.

In other aspects, the present disclosure contemplates methods of making a microfluidic photoionization detector (PID). In one example, the method may comprise forming a microfluidic channel in a substrate. In certain aspects, the substrate may be treated prior to forming the microfluidic channel. For example, one or more layers may be applied to the substrate that will be etched to form the microfluidic channel. In certain variations, one or more layers of an electrically conductive material (or other materials) may be applied to the substrate. In one variation, a conductive silicon wafer may first be anodically bonded to a PYREX™ glass wafer substrate. Then, a second layer comprising silicon dioxide may be deposited on top of the silicon wafer using plasma-enhanced vapor deposition (PECVD). After forming the conductive silicon and silicon dioxide layers, they may be patterned in a shape (e.g., a serpentine shape like an Archimedean spiral) and then etched to form the microfluidic channel. In one variation, patterning may include applying a 2.0 µm thick aluminum layer using lithography, evaporation, and liftoff, followed by deep reactive-ion etching (DRIE) to etch through the silicon wafer to form a final microfluidic channel. After formation of the microchannel, at least two electrodes are contacted with distinct surface regions and placed in electrical connection with an external source of power. A transparent window of a UV light source may be placed over the patterned region to form the microfluidic channel. A sealant may be applied around the periphery of the PID device. The UV light source may thus be affixed as part of the PID device by adhesive or by additional securing means, such as mechanical fasteners.

EXAMPLES

Highly doped p-type <100> single-sided polished conductive Si wafers with a resistivity of 0.001-0.005 Ωcm and a thickness of 380 µm, and 500 µm thick PYREX™ glass wafers are purchased from University Wafer Company (Boston, Mass., P/N 1318 and P/N 1112, respectively). A 10.6 eV VUV Kr lamp with $MgF_2$ crystal window was purchased from Baseline-Mocon (P/N 043-257). GC guard columns (250 µm inner diameter (i.d.) and 380 µm outer diameter (o.d.)) and HP-5 coated columns (250 µm i.d., 380 µm o.d., 0.25 µm coating thickness) are purchased from Agilent. Optical adhesives (Norland® 81) are purchased from Norland (Cranbury, N.J.). The commercial PID used for purpose of comparison in the experiments is acquired from Baseline-Mocon (P/N 043-234). Commercial flame ionization detector (FID) used in the experiments is pre-installed on a Varian 3800 GC instrument.

Test analytes of benzene (P/N 270709), toluene (P/N 650579), ethylbenzene (P/N 03080), m-xylene (P/N 95670), and hexane (P/N 34859) are purchased from Sigma-Aldrich (St. Louis, Mo., USA) and used without further purification. The relevant physical properties of those VOCs are listed in Table 3.

TABLE 3

| VOC | $VP^a$ | $Density^b$ | $IP^c$ |
|---|---|---|---|
| Benzene | 75.1 | 876.50 | 9.25 |
| Toluene | 22.0 | 866.90 | 8.82 |
| Ethylbenzene | 7.15 | 866.50 | 8.76 |
| m-Xylene | 6.16 | 860.00 | 8.56 |
| Hexane | 121 | 654.80 | 10.18 |

$^a$Vapor pressure (mm Hg) at 20° C.
$^b$Mass density (kg m$^{-3}$).
$^c$Ionization potential (eV)

A microfluidic PID having a microchannel in the form of an Archimedean spiral is fabricated on a conductive silicon wafer that was first anodically bonded to a PYREX™ glass wafer, for example, like the PID device 50 shown in FIG. 2. Next, 2.0 µm of silicon dioxide is deposited on top of the silicon wafer using plasma-enhanced vapor deposition (PECVD) and patterned. After patterning a 2.0 µm thick aluminum layer using lithography, evaporation, and liftoff, deep reactive-ion etching (DRIE) is used to etch through the silicon wafer to form a final channel that had a cross section of 150 µm (width)×380 µm (depth), a wall thickness of 50 µm, and a length of 2.3 cm. The entire channel has an overall size of 15 mm×15 mm, as shown in FIG. 3.

Figure 3:
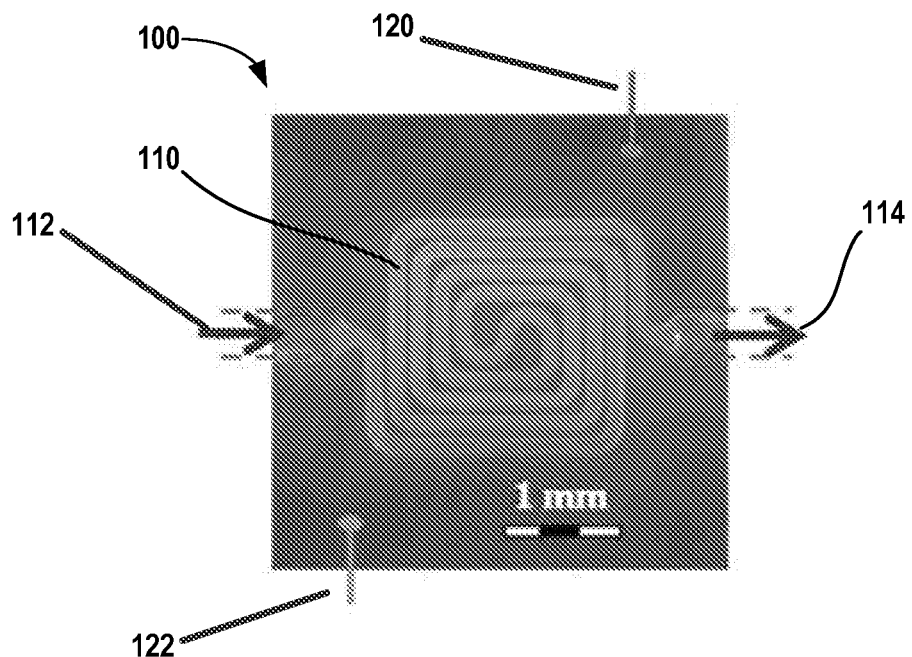
FIG. 3 shows an image of the microchannel portion of a PID device 100 as formed in accordance with certain aspects of the present disclosure.
Figure 4:
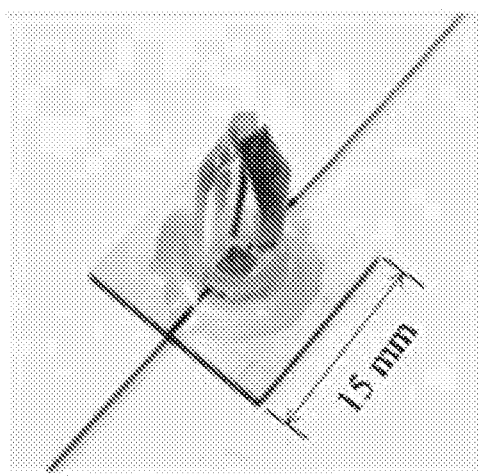
FIG. 4 is photograph of an assembled PID device having a VUV lamp affixed as part of the assembly.

FIG. 3 shows an image of the microchannel portion of a PID device 100 as formed, while FIG. 4 is photograph of an assembled PID device having a VUV lamp affixed as part of the assembly. The microfluidic channel 110 has an inlet 112 and an outlet 114. In order to reduce the dead volume at the interconnection between the GC column and the microfluidic channel, the terminals of the microfluidic channel had a trapezoidal shape (400 µm (bottom width)×150 µm (top width)×100 µm (height)). The terminals (inlet 112, outlet 114) of the microfluidic channel 110 are further connected to an inlet/outlet port (5.9 mm in length), so that the guard columns could be inserted (FIGS. 3 and 4). The ionization chamber volume is 1.3 µL; the dead volume, which arises mainly from the connections between the GC column and microfluidic PID inlet/outlet, is estimated to be approximately 2 nL.

After microfluidic channel fabrication, a first electrode 120 is connected to a first select region of the electrically conductive layers (silicon and silicon dioxide layers). A second electrode 122 is connected to a second select region of the electrically conductive layers. In certain aspects, two electrodes 120,122 may be wire bonded to an electrically conductive layer (e.g., conductive silicon/silicon dioxide layers or aluminum layer) and connected to the voltage supply and the amplifier, like that shown in FIG. 2.

Then, a VUV Kr lamp with $MgF_2$ crystal window is mounted on the top of microchannel and sealed with optical adhesive. The lamp has an effective illumination diameter of 3.5 mm, and therefore, is able to cover the entire microfluidic PID area (2.4 mm×2.4 mm). Finally, two 10 cm long guard columns are inserted into the inlet and outlet ports, respectively, and sealed with optical adhesive.

The detail of microfluidic PID operation is similar to the system illustrated in FIG. 2. In order to power the VUV lamp, the power drive circuit coming with the commercial PID (usually connected to a 5 VDC external voltage supply) is used. The two electrodes on the microfluidic channel are connected to −6 V DC and ground, respectively, which generated an electric field of approximately 400 V/cm across the microfluidic channel. The electrodes are further connected to an amplifier (Stanford Research Systems SR560, input impedance=100 MΩ+25 pF) to form a closed circuit.

As noted above, a PID signal is directly generated from the charges on photoionized molecular fragments that produce current between the electrodes. According to Ohm's law, the final voltage signal is proportional to the current signal across the internal resistance of the amplifier. During the operation the amplifier bandwidth is maintained at 10 Hz. The output voltage signal from the amplifier is acquired through a data acquisition (DAQ) card (NI USB-6009, National Instruments, Austin, Tex.) via a LABVIEW™ program. Note that although the p-type conductive silicon wafer has a high concentration of free holes the photoelectric effect could still occur when the wafer was exposed to 10.6 eV VUV.

Figure 5:
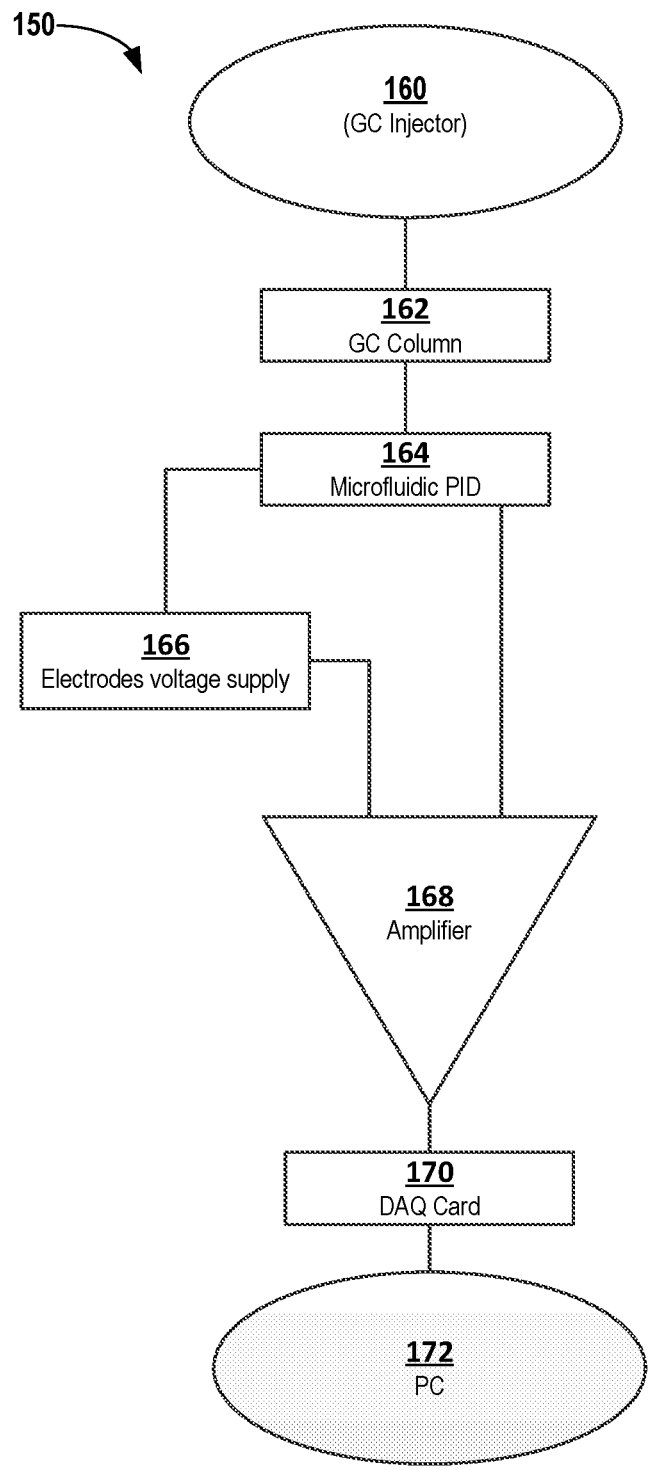
FIG. 5 shows a schematic illustrating an operating principle of a power supply circuit integrated with a gas chromatography system and microfluidic photoionization detector (PID) device system according to certain aspects of the present disclosure.

A schematic of a system 150 having a microfluidic photoionization detector (PID) device and a gas chromatography (GC) unit is shown in FIG. 5. A GC injector 160 introduces a fluid sample into a GC column 162. As the sample is separated and eluted from the GC column 162 it is introduced into a microfluidic PID 164. The microfluidic PID 164 is in electrical communication with electrodes 166 connected to a power source that supplies voltage. The microfluidic PID 164 is also in electrical communication with an amplifier 168. The amplifier 168 and the electrodes 166 form part of a power drive circuit. The amplifier 168 is in communication with a DAQ card 170 that is in communication with a PC/computer 172 that together monitor and collect data on signals generated in the microfluidic PID 164. It should be noted that the present disclosure contemplates replacing the larger and more cumbersome amplifier and voltage supply with a compact electronic circuit for certain applications.

As shown in FIG. 6, when the VUV light is turned on, a baseline jump of approximately 94.3 mV, which corresponds to a 94.3 pA current change prior to the amplifier. The standard deviation of the noise is 0.68 mV. Amplification is 10 times. Internal resistance of the amplifier=100 MEI+25 pF. During the measurement, helium flows through the microfluidic PID at a flow rate of 2 mL/min. Inset shows long-term stability up to 5.5 minutes.

FIGS. 7A-7B show microfluidic PID temperature stability tests. FIG. 7A is a baseline as a function of device temperature. The noise level remains the same as for 20° C. in FIG. 6. FIG. 7A also characterizes the microfluidic PID temperature stability from 20° C. to 60° C. by placing the entire device inside a GC oven. When the temperature is below 40° C., the baseline remains nearly the same as for 20° C. For the temperature close to the VUV lamp's specified maximal operating temperature (60° C.), a 44% increase in the baseline is observed. However, the microfluidic PID noise remains constant (0.68 mV). In addition, the PID's sensitivity to analyte stays nearly unchanged (<10%), as shown in FIG. 7B. In the subsequent experiments the microfluidic PID is operated at 20° C. unless otherwise specified. Therefore, the corresponding baseline is subtracted in data analysis.

Five analytes, benzene, toluene, ethylbenzene, m-xylene, and hexane, are selected as model systems. The VOC samples are picked up at the headspace of the corresponding screw-thread vials or diluted gaseous samples in TEFLON® PTFE septa sealed vials via a gas-tight syringe and then injected into the injection port of a Varian 3800 GC instrument with a split ratio of 60. For detector characterization, the detector (microfluidic PID according to the present disclosure, or a comparative commercial PID or FID) is connected to the GC injection port via a 3 meter long guard column. For VOC separation experiment, a 6 meter long HP-5 column is used to replace the guard column. Helium is used as the carrier gas.

For comparison purposes, a VOC measurement by using a commercial PID and FID pre-installed on a Varian 3800 GC instrument to replace the microfluidic PID is performed. The GC column is connected to the inlet port of the commercial PID and the PID was driven by 5 VDC. The signals from the FID and the commercial PID are recorded directly by the DAQ card without going through the SR560 amplifier.

Compared to previously reported PIDs and commercial PIDs, which usually have a fluidic chamber volume in the range of 10 s to 100 s of μL and a dead volume of a few μL to 10 s μL, the microfluidic PID has a significantly reduced chamber volume of only 1.3 μL with a nearly negligible dead volume (about 2 nL). The smaller chamber volume and dead volume translate directly to a faster detector response time.

FIG. 8A compares the flow rate dependent full-width-at-half-maximum (FWHM) value for a microfluidic PID prepared in accordance with certain variations of the present disclosure, a conventional commercial PID, and a conventional FID. More specifically, FIG. 8A shows FWHM comparisons of the toluene peak obtained with commercial PID, FID, and the microfluidic PID at various flow rates. Error bars are calculated based on four measurements. As the flow rate increases from 2.3 mL/min to 10 mL/min, the microfluidic PID peak width (FWHM) decreases from 0.25 seconds to 0.085 seconds. The peak width is caused mainly by the dead volume in the GC injector and longitudinal dispersion of the analyte (toluene) in the GC column.

In fact, FIGS. 8B and 8C show that the microfluidic PID generates a peak width and shape virtually identical to FID, which has zero dead volume. FIGS. 8B and 8C show normalized toluene peaks obtained with FID and microfluidic PID at flow rates of 2.3 mL/min and 10 mL/min, showing FWHM of 0.25 seconds and 0.085 seconds, respectively. The response time measured from the bottom to 90% of peak height is approximately 65% of FWHM. The corresponding toluene peaks obtained with commercial PID are given in FIGS. 9A-9B. The fastest response time (defined as the time from the bottom to 90% of peak height, approximately 65% of FWHM) for the microfluidic PID is about 0.055 seconds at 10 mL/min flow rate, close to 0.03 seconds obtained with the state-of-the-art PID at 30 mL/min flow rate and with a very short (0.2 m) column (no longitudinal dispersion).

In contrast, the commercial PID, which has a chamber volume of about 200 μL, has a peak width of 1-2.5 seconds, consistent with the peak width achieved by other commercial PIDs under high flow rates. The peak width of the microfluidic PID is easily reduced by 10-fold compared to the commercial PID. Ultimately, the peak width is limited by the residence time determined by the PID chamber volume and dead volume. For the inventive microfluidic PIDs, the detection speed can be as fast as 78 milliseconds for a flow rate of 1 mL/min, which can further be improved by using a shorter channel length or smaller cross section.

FIG. 10 plots the peak height as a function of injection mass for the five selected VOCs. While the peak height is similar for benzene, toluene, ethylbenzene, and m-xylene, it is much smaller for hexane, which is due to the high ionization potential (10.18 eV, close to 10.6 eV light provided by the VUV lamp). At low injection mass, the peak height increases linearly with respect to the increased injection mass with no change in the peak width, which is reflected in the unity slope of those curves in the log-log scale. See FIGS. 15A-15E show microfluidic PID signals for repeatable measurements (4 times) of five analytes that were injected into the GC-PID system at the lowest injection mass for the five selected VOCs (benzene, toluene, ethylbenzene, m-xylene, and hexane). At high injection masses (about 1 μg), the peak height starts to saturate accompanied by the peak broadening.

To estimate the detection limit, linearity of the peak height versus mass, signal-to-noise ratio, and the noise ($\sigma$) of 0.68 mV for the microfluidic PID are considered. The corresponding detection limit equivalent to $3\sigma$ for the flow rate of 2.3 mL/min is presented in Table 4. For comparison, Table 4 also lists the detection limit for the commercial PID and FID. It is found the microfluidic PID can detect VOCs down to the single pico-gram level (except for hexane, which has an ionization potential close to the VUV photon energy). For the commercial PID, the detection limit is about 200 times higher than the microfluidic PID, which can partially be accounted for by nearly 200 times larger chamber volume. Table 4 shows a comparison of detection limits for FID, a microfluidic PID prepared in accordance with certain variations of the present teachings, and a conventional commercial PID.

TABLE 4

|  | Benzene | Toluene | Ethylbenzene | m-Xylene | Hexane |
| --- | --- | --- | --- | --- | --- |
| FID | 0.62 pg (0.2 ppt) | 0.90 pg (0.24 ppt) | 1.46 pg (0.34 ppt) | 1.47 pg (0.34 pg) | 0.80 pg (0.23 ppt) |
| Microfluidic PID | 4.25 pg (1.4 ppt) | 4.48 pg (1.2 ppt) | 5.68 pg (1.3 ppt) | 5.00 pg (1.2 ppt) | 30.6 pg (8.8 ppt) |
| Commercial PID | 750 pg (240 ppt) | 861 pg (230 ppt) | 1354 pg (320 ppt) | 1009 pg (230 ppt) | 8081 pg (2300 ppt) |

Part-per-trillion (ppt) is calculated for 1 L of gas at 1 atm. and 300K

The excellent detection limit of the microfluidic PID is achieved by a combination of large VUV illumination area, short illumination path, short electrode distance, and large electrode area. First, due to the serpentine structure of the microfluidic channel, the effective VUV illumination area is about 3.5 mm$^2$, about 60% of the entire area that the microfluidic channel occupies (2.4 mm×2.4 mm, see FIGS. 3-4). In addition, due to the absorption of analytes, VUV light intensity decays very rapidly when it passes the ionization chamber. The short illumination path (380 μm) ensures that the analytes can be uniformly and efficiently ionized.

Second, during the photoionization process, recombination and quenching of anions and cations increase with the longer transit time for ions to reach the electrodes.

A simple calculation shows that the transit time is proportional to the distance of electrodes and the inverse square root of the applied voltage; see equation below that shows a transit time calculation.

Assuming a uniform electric field, the time for ions to move from one electrode to another, t, is given by $$t = \sqrt{\frac{2m}{eV}} \cdot L,$$

where m and e are the mass and charge of an ion, respectively. L is the distance between the two electrodes. V is the applied voltage.

Therefore, decreasing the electrode distance is a more effective way of decreasing the transit time. The short distance between the electrodes (150 μm) in the microfluidic PID results in a high electric field with only 6 VDC as well as suppression of recombination and quenching of ions; which, together with the large electrode area (8.74 mm), significantly enhances the ion collection efficiency and uniformity. The improved PID performance is not only reflected in the detection limit, but also in the linearity of the device responsivity curve, as discussed further below. A sub-linear responsivity curve indicates insufficient and non-uniform photoionization and ion collection.

Besides excellent sensitivity and detection limit, PIDs desirably exhibit a large linear detection range. FIGS. 11A-11B represent the responsivity curves of microfluidic PID for five different VOCs with the injection mass ranging from below 50 pg to over 1000 ng. The peak areas in FIG. 11B show excellent linear response to the injection mass with R$^2$ of 0.961-0.985 (see Table 5) in the linear regression analysis (forced zero Y-intercept at zero injection mass). Table 5 shows linear curve fit parameters used in FIG. 11A.

TABLE 5

| Due to the limitation of guard column capacity and sampling, the injection | | | | | |
| --- | --- | --- | --- | --- | --- |
|  | Benzene | Toluene | Ethyl-benzene | m-Xylene | Hexane |
| Slope (Vs per ng) | 0.10452 | 0.07719 | 0.04908 | 0.05752 | 0.01274 |
| R$^2$ | 0.9856 | 0.96264 | 0.96136 | 0.9734 | 0.98119 |
| Molecular weight (g/mol) | 78 | 92 | 106 | 106 | 86 |
| Slope (Vs per mol) | 7.8 × 10$^9$ | 7.1 × 10$^9$ | 5.2 × 10$^9$ | 6.1 × 10$^9$ | 1.1 × 10$^9$ | mass did not cover six orders of magnitude experimentally. Because the detection limit of the microfluidic PID is only a few pico-grams and, according to FIG. 10, at the low injection masses the peak area should decrease as the peak height decreases (but the peak width remains unchanged), an inference can be drawn that the linear range for the microfluidic PID spans six orders of magnitude from a few pico-grams to a few micro-grams. In contrast, in the comparative Sun et al., "An improved photoionization detector with a micro gas chromatography column for portable rapid gas chromatography system," Sens. Actuators B. 188, pp. 513-518 (2013), the relevant portions of which are incorporated herein by reference, although the injection mass (or concentration) is increased by six orders of magnitude, the sensing signal increases only about 1000-fold, indicating imperfect fluidic design as well as insufficient and non-uniform photoionization and ion collection. Finally, the slope of FIGS. 11A-11 is given in Vs per ng (see Table 5). Except hexane, which has the ionization potential very close to the VUV photon energy and is difficult to ionize, the remaining four VOCs have similar ionization potential, but their responsivity slope varies from 0.1 for benzene to 0.049 for ethylbenzene. However, the new slopes in units of Vs per mol, achieved by multiplying each slope with the VOC's respective molecular weight, are close to each other (see Table 5). This suggests that the microfluidic PID detects the molar concentration of the analyte, agreeing with the detection mechanism expected of a PID.

To demonstrate the performance of the microfluidic PID in a GC system, nine VOC analytes are separated using a 6 meter long HP-5 column. FIGS. 14A-14B show signal (V) versus time (seconds) for 9 VOCs. Each VOC, along with the injected mass and FWHM are: 1. vinylchloride (2.1 ng, 0.6 s); 2. cis-1,2-dichloroethene (1.0 ng, 0.7 s); 3. benzene (1.2 ng, 0.7 s); 4. trichloroethylene (2.1 ng, 0.8 s); 5. toluene (1.5 ng, 0.9 s); 6. tetrachloroethylene (1.1 ng, 1 s); 7. chlorobenzene (1.0 ng, 1.2 s); 8. ethylbenzene (1.5 ng, 1.2 s); 9. m-xylene (1.5 ng, 1.3 s). Temperature ramping: T=40° C. for 0.2 minutes and then to 75° C. at a rate of 30° C./min. FIG. 14A shows helium and FIG. 14B shows dry air (B) used as the carrier gas at a flow rate of 2.0 mL/min.

The analytes are picked up at the headspace of the corresponding screw-thread vials and then injected into the injection port of a Varian 3800 GC instrument with a split ratio of 60. High purity helium is used as the carrier gas at the flow rate of 2.0 mL/min. The column temperature is initially set at 40° C. for 0.2 minutes and then ramped to 75° C. at a rate of 30° C./min. All the peaks are symmetric with the peak width (FWHM) below or around 1 second, which represents drastic improvement over the previous GC separation results using the commercial PID and make-up gas.

In accordance with the present disclosure, a microfluidic PID is provided that can be used in a GC (μGC) system for rapid and highly sensitive VOC detection. Due to its flow-through design and non-destructive nature, the microfluidic PID can be placed nearly anywhere in the flow path. For example, a two-dimensional GC may use a non-destructive flow-through setting of the PID at the junction between the end of the first dimensional column and the entrance of the subunit of the second dimensional columns. Furthermore, the simple and robust structure as well as low voltage operation enables field applications of the microfluidic PID.

The present disclosure contemplates further refinements at the component level, sub-system level, and GC system level. At the component level, improvements further reducing the microfluidic PID base current and related noise will achieve an improved and lower detection limit. For example, a UV shielding layer can be deposited to cover the exposed silicon. Different channel dimensions and serpentine structures may enhance the VUV illumination and ion collection efficiency. A compact electronic circuit can also be used to replace the cumbersome amplifier and voltage supply. Further, an electromagnetic shield may be placed around the microfluidic PID to reduce electromagnetic interference. Furthermore, a micro-discharge based VUV light source that is micro-fabricated directly on chip may be used to replace the VUV lamp. At the sub-system level, a μGC separation column can be co-constructed on the same chip with the microfluidic PID to achieve higher integration. At the GC system level, the microfluidic PID can be installed in multi-dimensional μGC systems to monitor the analytes eluted from each dimension. Finally, the microfluidic PID can be used in tandem with other electronic vapor sensors, such as graphene nano-electronic vapor detectors, to achieve better discrimination in vapor sensing.

In certain other aspects, the present disclosure contemplates methods of calibrating a system having a plurality of photoionization detectors (PID). In such a method, the system may include multiple PID units. The PID units may be conventional PID units or microfluidic photoionization detectors (μPIDs) prepared in accordance with certain aspects of the present disclosure described above. At least one of the PID units is used as a reference detector and a calibration factor is calculated that can be used against the remaining PID units in the system. For example, a first PID unit may be in an upstream first dimension module and one or more second PID units may be in a downstream second dimension module. The one or more second PID units may be part of an array (e.g., multiple PID units parallel with one another) in the second dimension. Each of the first dimension module and the second dimension module(s) may have one or more gas chromatography columns. The first PID unit may be used as a reference detector to calibrate the one or more second PID units.

PIDs exhibit different responsivities toward different chemical compounds due to their different ionization potentials. Such a responsivity difference for a given PID is calibrated with isobutylene and reported as the response factor (or correction factor), which is a ratio between the sensitivity of isobutylene to that of a target compound. Meanwhile, different PIDs may have different responsivities towards the same chemical compound with the same concentration or mass. Such differences may result from the factors like different aging conditions of the PID lamps (due to their finite lifetime and Krypton gas leakage) and the PID windows (caused by contamination of gas analytes, water etching, crystal solarization and yellowing effect due to UV damage). It can also be caused by the imperfect alignment between the lamp window and the microfluidic channel in the PID during assembly. The variations in the responsivity of PIDs may be detrimental to the employment of multiple PIDs in a GC system, especially in a multi-dimensional GC system.

To calibrate the difference in responsivity of different PIDs, each PID's response to all target analytes at all anticipated concentrations (or masses) can be measured. However, this method is tedious and sometimes impossible to accomplish. The easiest and most practical approach is to compare and calibrate the responses of all PIDs in a GC system with a single analyte at a given concentration. The question is whether or not the calibration factor obtained with this analyte at the given concentration can be generally applicable to other analytes of a different concentration. In this variation, a systematic study is conducted regarding the response of 5 Krypton μPIDs (UV photon energy: 10.6 eV) prepared in accordance with certain aspects of the present teachings in a 1×4-channel 2-dimensional μGC system to 7 different volatile organic compounds (VOCs) with ionization potential ranging from 8.45 eV to 10.08 eV and concentration ranging from approximately 1 ng to approximately 2000 ng. Using one of the PIDs as the reference detector, the calibration factor for each of the rest 4 PIDs is obtained against the first PID, which is quite uniform regardless of the analyte, its concentration, or chromatographic peak width.

Based on the above observation, the coeluted peaks in the first dimension are quantified using the signal obtained with a PID array in the second dimension. This enables rapid and in-situ calibration of PIDs in a multi-dimensional μGC system using a single analyte at a single concentration. In turn, it also provides the ability to employ multi-channel multi-dimensional GC where multiple PIDs are installed.

First, a μPID module prepared in accordance with certain aspects of the present disclosure is prepared and assembled. The microfluidic flow-through ionization chamber/channel is formed in accordance with the present teachings. A Krypton UV lamp and a commercially available built-in lamp drive circuit and the amplifier from Baseline-Mocon (Lyons, Colo., P/N #043-234) are assembled with the microfluidic flow-through ionization chamber/channel. Rather than using a serpentine microfluidic channel as in other variations of the present disclosure, in this embodiment, a simplified version of μPID 200 having a straight-line microchannel 210 is constructed as shown in FIGS. 16 and 17. FIG. 16 shows the entire μPID 200 assembly while FIG. 17 shows a detailed portion of a μPID including the microfluidic channel 210. The microfluidic channel 210 is created by a gap 212 (e.g., about 380 μm) between a first substrate 214 and a second substrate 216. A 380 μm wide, 380 μm tall and 2 cm long microfluidic channel is created by the gap 212 between the first substrate 214 and second substrate 216. The first and second substrates 214, 216 may be p-type <100> conductive silicon wafers with a resistivity of 0.001-0.005 Ωcm. The first and second substrates 214, 216 substrates have an exemplary thickness of about 380 μm. The bottom and top of the microfluidic channel 210 is covered by a Krypton UV lamp 220 and a glass slide 222, respectively, which are glued to the conductive first and second substrates 214, 216 (e.g., silicon wafers) with an optical adhesive, such as an epoxy. The Krypton UV lamp 220 is associated with a built-in lamp drive circuit (not shown) and amplifier 230. The effective UV illumination length in the channel is about 3.5 mm (i.e., the diameter of the Krypton lamp window). Because the side of the microfluidic channel 210 is made of a conductive silicon wafer, it serves as a signal collection electrode in this device configuration. Two copper wires 232 are bonded to the first and second substrates 214, 216 (e.g., silicon wafers) and connected to the amplifier 230. Finally, two guard columns 234 (e.g., having a 250 µm inner diameter and 380 µm outer diameter) are inserted into an inlet 236 and an outlet 238 of the microfluidic channel 210 and sealed with optical epoxy.

To show the general concepts of the calibration technique, an experimental setup for PID and GC system 250 for PID characterization is illustrated in FIG. 18. The configuration in FIG. 18 includes five PIDs 260-268 (respectively labeled 1A and 2A-2D) made in accordance with certain aspects of the present disclosure having a design like that shown in FIGS. 16 and 17. The PID and GC system 250 is arranged in a format resembling 1×4-channel 2-D GC so that the response of PIDs 262, 264, 266, and 268 (2A-2D) can be calibrated against that of PID 260 (1A). The first ($1^{st}$) dimensional module includes a microfabricated preconcentrator (µPrecon) 270, one 10 m long RTX-5 ms gas chromatography column 272, and PID 260 (1A). Each of the $2^{nd}$ dimensional modules 274 includes a microfabricated thermal injector (µTI) 276, one 3 m long RTX-200 gas chromatography column 278, and a PID (one of 262-268) to be calibrated. The flow routing system between the two separation modules includes three microfabricated Deans (µDeans) switches 280 with two three-port solenoid valves to route the analytes from PID 1A to the subsequent PIDs in the $2^{nd}$ dimension.

The µPrecon 270 and µTIs 276 include a deep-reactive-ion-etched (DRIE) silicon cavity with tapered inlet/outlet ports, an integrated platinum heater, a temperature sensor, and micro fluidic channels. CARBOPACK™ B granules are loaded into the cavity through a third port using a diaphragm pump, which is sealed with a silicon adhesive after loading. A small segment of guard column is inserted into the inlet and outlet fluidic ports, and secured with an epoxy adhesive. For electrical connection, the heater and resistive temperature detector (RTD) are wire-bonded to a printed circuit board. The µPrecon 270 and µTI 276 are preconditioned at 300° C. for 12 hours under helium flow before use.

10 m long RTX®-5 ms 272 and 3 m long RTX®-200 278 GC columns and nickel wire are placed in parallel and wrapped by TEFLON™ PTFE tape, and then coiled into a helix of 10 cm and 5 cm in diameter and 1 cm in height. A type K thermocouple is inserted into the gap between the coiled column to monitor column temperature in real time via USB-TC01. To achieve a programmed temperature ramping profile, a pulse-width-modulated signal (4.0-Hz square wave) is applied to the heater power relay via USB-6212. The duty cycle of square wave is calculated by a proportional-integral-derivative controller in the LABVIEW™ program and updated every 0.4 s based on the set-point temperature and measured temperature at that moment.

All components, µPrecon 270, µTI 276, the heater wrapped columns 272, 278 and the µPIDs 260-268, are mounted on a custom printed circuit board. The guard column affixed to each component is connected by universal press-tight glass capillary column connectors or an angled Y connectors. A home-made LABVIEW™ program is developed for automated control and operation of the system, as well as PID signal readout.

Seven analytes include benzene (>99.9%), toluene (99.5%), ethylbenzene (99.8%), heptane (99%), styrene (99.9%), chlorobenzene (99.8%), p-xylene (99%), and 2-heptanone (99%) from Sigma-Aldrich (St. Louis, Mo.) are used as received. CARBOPACK™ B (60-80 mesh) is purchased from Supelco (Bellefonte, Pa.). A compressed helium gas (99.998%) is purchased from Cryogenic gases (Detroit, Mich.). GC guard columns (250 µm inner diameter (i.d.) and 380 µm outer diameter (o.d.)) Rtx-5 ms (10 m×250 µm i.d., 0.25 µm coating thickness), RTX-200 (12 m×250 µm i.d., 0.25 µm coating thickness), universal press-tight glass capillary column connectors and angled Y connectors are purchased from Restek (Belafonte, Pa.). Two-port and three-port solenoid valves are purchased from Lee Company (Westbrook, Conn.). A diaphragm pump is purchased from Gast Manufacturing (Benton Harbor, Mich.). Nickel wire (0.32 mm diameter, 1.24 Ohms/m) is purchased from Lightning Vapes (Bradenton, Fla.). A type K thermocouple is purchased from Omega Engineering (Stamford, Conn.). A silicon wafer is purchased from University Wafer (Boston, Mass.). The PIDs are made having the microfluidic flow-through ionization chamber/channel prepared as described above, while the UV lamp and amplifier are purchased from Baseline-Mocon (Lyons, Colo.). A 36V AC/DC converter is purchased from TDK-Lambda Americas Inc. (National City, Calif.). A 24V and a 12V AC/DC converters and axial fans are purchased from Delta Electronics (Taipei, Taiwan). Data acquisition cards, USB-6212 (16 bits) and USB-TC01 (for thermocouple measurement), are purchased from National Instruments (Austin, Tex.).

The operation procedure is divided into two steps, i.e., the first detection by PID 260 (1A) and subsequent second detection by PIDs 262-268 (2A-2D). In the first detection step, the gas analyte is drawn by a diaphragm pump 282 through a two port valve 284 and adsorbed into CARBOPACK™ B inside the µPrecon 270. After sampling, the two valves 284 are closed, so that helium gas from a gas source 286 flows through a three-port valve 288. The µPrecon 270 is heated up to 270° C. in 0.6 s and then kept at 250° C. for 10 s for complete thermal desorption. The analyte undergoes the first separation through a RTX-5 ms column 272, and then is detected by PID 260 (1A). During the experiment, the column 272 is heated and kept at 50° C. for 1 min and then ramped at a rate of 5° C. $\min^{-1}$, whereas PID 260 (1A) is kept at room temperature (25° C.).

In the subsequent second detection step, each of the analytes (either partial or entire amount) passing through PID 260 (1A) is routed by the µDeans switches 280 and trapped by the µTI 276 in one of the $2^{nd}$ dimensional modules 274. Then, the µTI 276 is heated to 270° C. in 0.6 s and then kept at 250° C. for 5 s. During the experiment, all columns in the $2^{nd}$ dimension are kept at 40° C., whereas PIDs 262-268 (2A-2D) are kept at room temperature (25° C.).

To test and calibrate the PID's response, individual analytes of certain mass are first placed in a TEDLAR™ bag and then collected by the µPrecon 270 and injected into the $1^{st}$ dimensional column 272. After detected by PID 260 (1A), the analyte is injected into one of the $2^{nd}$ dimensional columns 278 and detected by the corresponding PIDs 262-268 (PIDs 2A-2D). The same procedure is repeated until all four PIDs in the $2^{nd}$ dimension are tested.

FIGS. 19(a)-19(b) show the response of all five PIDs 262-268 used in the experiment (PID 1A and PIDs 2A-2D) to two representative analytes (ethylbenzene (FIG. 19(a)) and toluene (FIG. 19(b))). Due to the non-destructive nature of the PIDs, the same amount of the analyte flows through both PID 1A and one of the PIDs in the $2^{nd}$ dimension, so that the PID's responsivity in the $2^{nd}$ dimension can be compared with that of PID 260 (1A). For simplicity, throughout PID 260 (1A) is used as the reference and calibrates the responsivity of PIDs 262-268 (2A-2D) against that of PID 260 (1A). From FIG. 19(a)-19(b), it can be seen that the PIDs exhibit quite different responses to the same analyte of the same quantity. Such variations may result from the different aging conditions of the UV lamps and UV window, and possible misalignment of the window with respect to the microfluidic channel during μPID assembly. The calibration factor, E, for a given PID in the $2^{nd}$ dimension is defined by the ratio of the peak areas, i.e., $$E_i = \frac{A_i}{A_{1A}}, (i = 2A, 2B, 2C \text{ and } 2D) \quad (1)$$

where $A_i$ is the peak area obtained from PIDs 2A-2D and $A_{1A}$ is the peak area obtained from PID 1A.

Using the same method described above, the response of PIDs 2A-D is calibrated to seven different analytes with the ionization potential ranging widely from 8.45 eV (p-xylene) to 10.08 (heptane). Table 6 shows comparison of the calibration factor (standard deviation) of PIDs 2A-2D to seven different analytes. The averaged calibration factor (standard deviation) is given by $E_i$.

TABLE 6

| PID | Toluene | Ethylbenzene | Styrene | Heptane IP* | Chlorobenzene | Benzene | p-xylene | |
|---|---|---|---|---|---|---|---|---|
| No. | 8.82 | 8.76 | 8.47 | 10.08 | 9.07 | 9.25 | 8.49 | $E_i$ |
| 2A | 0.343 | 0.342 | 0.336 | 0.343 | 0.343 | 0.342 | 0.349 | 0.343 |
|    | (0.009) | (0.003) | (0.009) | (0.011) | (0.002) | (0.003) | (0.003) | (0.005) |
| 2B | 0.404 | 0.405 | 0.401 | 0.406 | 0.403 | 0.408 | 0.403 | 0.404 |
|    | (0.007) | (0.015) | (0.013) | (0.011) | (0.013) | (0.032) | (0.013) | (0.014) |
| 2C | 0.328 | 0.332 | 0.325 | 0.318 | 0.325 | 0.323 | 0.327 | 0.325 |
|    | (0.005) | (0.001) | (0.008) | (0.001) | (0.005) | (0.002) | (0.012) | (0.004) |
| 2D | 0.190 | 0.186 | 0.185 | 0.188 | 0.193 | 0.190 | 0.188 | 0.189 |
|    | (0.005) | (0.008) | (0.013) | (0.004) | (0.008) | (0.002) | (0.008) | (0.006) |

*Ionization potential (eV)

The results in FIG. 20 and Table 6 show that the calibration factor for each PID is quite uniform, although the seven analytes have quite different physical and chemical properties (such as ionization potential, vapor pressure, polarity, and chromatographic peak width, etc.). The above result suggests that the PID calibration factor can be obtained by using a single analyte.

In addition to the analyte dependent studies, the concentration dependency for PID's calibration factor is also investigated. FIG. 21(a) presents the peak area of toluene obtained with PID 260 (1A), 262 (2A), and 264 (2B) with the injection mass ranging from 1.5 ng to 1800 ng. The peak area shows the excellent linear response to the injection mass with an $R^2$ of 0.9990-0.9995 in the linear regression analysis (forced zero Y-intercept at zero injection mass). FIG. 21(b) plots the calibration factors of PIDs 262-264 (2A and 2B) for each injection mass that is extracted from FIG. 21(a), showing a consistent calibration factor across an injection mass spanned over 3 orders of magnitude. The above results suggest that the calibration factor for each PID can be obtained with a single concentration (or mass) of a single analyte.

A quantitative reconstruction of the coeluted peaks is further investigated herein. To further validate the calibration factors for the PIDs in the $2^{nd}$ dimension and to demonstrate an important application of using multiple PIDs, the coeluted peaks in the $1^{st}$ dimensional separation using the results obtained from the PIDs in the $2^{nd}$ dimension are quantitatively reconstructed. Reconstruction of the $1^{st}$ dimensional elution peaks is particularly important in comprehensive two dimensional (2-D) GC. Because the device in FIG. 18 has four columns and four PIDs in the $2^{nd}$ dimension, a portion of the eluent is routed from the $1^{st}$ dimension to the $2^{nd}$ dimensional columns alternately.

In this experiment, styrene and 2-heptanone as a model system. The black curve in FIG. 22(a) obtained by PID 260 (1A) shows that these two analytes are coeluted from the $1^{st}$ dimension around 145 seconds.

FIG. 23 illustrates how the eluent is cut and sent into the four $2^{nd}$ dimensional columns by the flow routing system and subsequently detected by PIDs 262-268 (2A-2D). In order to reconstruct the separation peaks originally overlapped in the 1st dimension, the area under each peak in the $2^{nd}$ dimension separation is computed and converted to the response of PID 260 (1A) using the calibration factor. FIGS. 22(a) and 22(b) present the reconstructed bars for styrene and 2-heptanone, respectively. The four bars are generated from the signal obtained by PIDs 2A-D. Each bar corresponds to a 5 s slice whose height, h, is computed as follows:

$$h_i = \frac{A_i}{E_i \times 5(s)}, \quad (2)$$

where $A_i$ is the peak area obtained by one of the $2^{nd}$ dimensional PIDs and $E_i$ is the calibration factor for that PID (see Table 6). The total area under those bars is 2.575 Vs and 3.03 Vs for styrene and 2-heptanone, respectively. The summation of the two sets of bars is plotted in FIG. 22(c) with summed area of 5.605 Vs, which is nearly the same as 5.85 Vs obtained directly by PID 260 (1A) (see the largest black curves in FIGS. 22(a)-22(c)). In order to verify the reconstruction of the $1^{st}$ dimension peak, FIGS. 22(a)-22(c)) also plot the elution peak of styrene and 2-heptanone detected by PID 1A when they are injected separately (see the red and blue curves in FIGS. 22(a)-22(b)). The peak area of 2.46 Vs for styrene and 3.006 Vs for 2-heptanone matches well the respective area obtained from the reconstructed peaks. The details of the peak areas are also given in Table 7, which shows a comparison of the total area under red, blue, and black bars obtained with PIDs 262-268 (2A-2D) and the peak area obtained with PID 260 (1A).

TABLE 7

|  | Styrene (red) | 2-Heptanone (blue) | Mixture (Black) |
| --- | --- | --- | --- |
| Bar | 2.575 (Vs) | 3.03 (Vs) | 5.605 (Vs) |
| Curve | 2.46 (Vs) | 3.006 (Vs) | 5.85 (Vs) |

The responsivity of different PIDs to seven VOCs with different ionization potentials and concentrations in 1×4-channel 2-D GC is shown. The calibration factor obtained by the ratio of the peak areas for each PID was uniform regardless of the analyte and its concentration, suggesting that the different PIDs can be calibrated with a single analyte with a single concentration. In addition, quantitative reconstruction of the coeluted peak in the $1^{st}$-dimension with a PID array in the $2^{nd}$ dimension is demonstrated. This enables the rapid and in-situ calibration of PIDs as well as the development of multi-channel multi-dimensional GC where multiple PIDs are employed.

Thus, in certain aspects, the present disclosure contemplates a method of calibrating a detection system comprising multiple photoionization detector (PID). The method may include measuring a first quantity of an analyte passing through a reference photoionization detector in the system and determining a first peak area ($A_i$) for the first quantity. A second quantity of the analyte passing through one or more second photoionization detectors downstream of the reference photoionization detector in the system can also be measured and at least one second peak area ($A_{1A}$) for the second quantity can be determined. Next, a calibration factor ($E_i$) can be calculated, for example, by the equation $$E_i = \frac{A_i}{A_{1A}}.$$

Such a calculation can be done on a computer or other specialized hardware specifically programmed and dedicated to determining the calibration factor ($E_i$). Then, the one or more second photoionization detectors can be calibrated based on the calibration factor Ei. In such a method, an initial test with only a single analyte is necessary to calibrate the one or more PID units for a variety of different analytes.

In certain variations, at least one of the reference photoionization detector and the one or more second photoionization detectors are a microfluidic photoionization detector. Such a microfluidic photoionization detector may include a substrate comprising a microfluidic channel having an inlet that receives a fluid sample comprising the analyte and an outlet from which the fluid sample exits the microfluidic channel, wherein the microfluidic channel has a total volume of less than about 9 μL. The microfluidic photoionization detector may also comprise a first electrode region and a distinct second electrode region defined on the substrate, where the first electrode region is separated from the second electrode region by the microfluidic channel. A source of UV light having a transparent window is disposed adjacent to a portion of the microfluidic channel, where the source of UV light is configured to direct photons to the portion of the microfluidic channel. In certain aspects, the transparent window of the UV light source may be disposed over the microfluidic channel, beneath the microfluidic channel, or along a side of the microfluidic channel.

In certain variations, the microfluidic channel has a serpentine pattern or a straight-line pattern. In certain variations, the serpentine pattern may be an Archimedean spiral or other spiral shape. In yet other aspects, the microfluidic channel may have a total volume of less than about 3 μL and a dead volume of less than or equal to about 3 nL. In certain aspects, the first electrode region and the second electrode region are connected to a low voltage power source having a maximum voltage of less than or equal to about 10 volts direct current (VDC). Any of the microfluidic photoionization detectors described previously above may be used in such a detection system.

In yet other variations, the detection system further comprises a first gas chromatography unit in fluid communication with the reference photoionization detector and one or more second gas chromatography units in fluid communication with the one or more second photoionization detectors. In certain aspects, the one or more second photoionization detectors are microfluidic photoionization detectors and the one or more second gas chromatography units are microgas chromatography units. The one or more gas chromatography units may thus form a multi-dimensional μGC system and the one or more second microfluidic photoionization detectors measure analytes in each dimension of the multi-dimensional μGC system.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A microfluidic photoionization detector (PID) comprising:
    a first layer;
    a second electrically conductive layer comprising an electrically conductive material disposed on the first layer;
    a microfluidic channel formed in and having two side walls defined by the second electrically conductive layer, the microfluidic channel having an inlet that receives a fluid sample and an outlet from which the fluid sample exits the microfluidic channel, wherein the microfluidic channel defines a serpentine pattern having a flow path with at least two 180° changes in direction;
    a first electrode region and a distinct second electrode region defined by the second electrically conductive layer, wherein the first electrode region is separated from the second electrode region by the microfluidic channel; and
    a source of UV light having a transparent window that is disposed adjacent to at least a portion of the microfluidic channel, wherein the source of UV light is configured to direct photons to the microfluidic channel.

2. The microfluidic photoionization detector (PID) of claim 1, wherein the serpentine pattern is an Archimedean spiral.

3. The microfluidic photoionization detector (PID) of claim 1, wherein the first layer defines a first wall of the microfluidic channel and the second electrically conductive material layer defines a second wall and a third wall of the microfluidic channel.

4. The microfluidic photoionization detector (PID) of claim 1, wherein the second electrically conductive layer comprises conductive doped silicon or an electrically conductive material.

5. A detection system comprising the microfluidic photoionization detector (PID) of claim 1 and further comprising a gas chromatography unit, wherein the gas chromatography unit is in fluid communication with the microfluidic photoionization detector (PID) and the microfluidic photoionization detector (PID) analyzes a sample eluted from the gas chromatography unit.

6. The microfluidic photoionization detector (PID) of claim 1, wherein a dead volume of the microfluidic channel is less than or equal to about 1% of a total volume of the microfluidic channel.

7. The microfluidic photoionization detector (PID) of claim 1, wherein the microfluidic channel has a total volume of less than about 10 μL and a dead volume of less than or equal to about 30 nL.

8. The microfluidic photoionization detector (PID) of claim 1, wherein the microfluidic channel has a total volume of less than about 3 μL and a dead volume of less than or equal to about 3 nL.

9. The microfluidic photoionization detector (PID) of claim 1, wherein the first electrode region and the second electrode region are connected to a low voltage power source having a maximum voltage of less than or equal to about 20 volts direct current (VDC).

10. A microfluidic photoionization detector (PID) comprising:
    a first layer;
    a second electrically conductive layer comprising an electrically conductive material disposed on the first layer;
    a microfluidic channel formed in and defined by the second electrically conductive layer, the microfluidic channel having an inlet that receives a fluid sample and an outlet from which the fluid sample exits the microfluidic channel, wherein a dead volume of the microfluidic channel is less than or equal to about 1% of a total volume of the microfluidic channel;
    a first electrode region and a distinct second electrode region defined by the second electrically conductive layer, wherein the first electrode region is separated from the second electrode region by the microfluidic channel; and
    a source of UV light having a transparent window that is adjacent to at least a portion of the microfluidic channel, wherein the source of UV light is configured to direct photons to the portion of the microfluidic channel.

11. The microfluidic photoionization detector (PID) of claim 10, wherein the microfluidic channel has a straight-line pattern or a serpentine pattern.

12. The microfluidic photoionization detector (PID) of claim 11, wherein the serpentine pattern is an Archimedean spiral.

13. The microfluidic photoionization detector (PID) of claim 10, wherein the second electrically conductive layer comprises conductive doped silicon or an electrically conductive metal.

14. The microfluidic photoionization detector (PID) of claim 10, wherein the microfluidic channel has a total volume of less than about 10 μL and a dead volume of less than or equal to about 30 nL.

15. The microfluidic photoionization detector (PID) of claim 10, wherein the microfluidic channel has a total volume of less than about 3 μL and a dead volume of less than or equal to about 3 nL.

16. The microfluidic photoionization detector (PID) of claim 10, wherein the first electrode region and the second electrode region are connected to a low voltage power source having a maximum voltage of less than or equal to about 20 volts direct current (VDC).

17. The microfluidic photoionization detector (PID) of claim 10, wherein the first layer defines a first wall of the microfluidic channel and the second electrically conductive material layer defines a second wall and a third wall of the microfluidic channel.

18. A microfluidic photoionization detector (PID) comprising:
    a first layer;
    a second electrically conductive layer comprising a conductive doped silicon disposed on the first layer;
    a microfluidic channel formed in and having two side walls defined by the second electrically conductive layer, the microfluidic channel having an inlet that receives a fluid sample and an outlet from which the fluid sample exits the microfluidic channel, wherein the microfluidic channel defines an Archimedean spiral pattern and a dead volume of the microfluidic channel is less than or equal to about 1% of a total volume of the microfluidic channel;
    a first electrode region and a distinct second electrode region defined by the second electrically conductive layer, wherein the first electrode region is separated from the second electrode region by the microfluidic channel; and
    a source of UV light having a transparent window that is disposed adjacent to at least a portion of the microfluidic channel, wherein the source of UV light is configured to direct photons to the microfluidic channel.

* * * * *